United States Patent
Miyako et al.

(10) Patent No.: US 11,289,987 B2
(45) Date of Patent: Mar. 29, 2022

(54) MOTOR MODULE, ROTATION ANGLE DETECTOR, AND METHOD FOR DETECTING ROTATION ANGLE OF MOTOR

(71) Applicant: ALPS ALPINE CO., LTD., Tokyo (JP)

(72) Inventors: Ikuyasu Miyako, Miyagi (JP); Tsutomu Abe, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 230 days.

(21) Appl. No.: 16/597,033

(22) Filed: Oct. 9, 2019

(65) Prior Publication Data
US 2020/0044525 A1    Feb. 6, 2020

Related U.S. Application Data

(63) Continuation of application No. PCT/JP2018/016644, filed on Apr. 24, 2018.

(30) Foreign Application Priority Data

Apr. 27, 2017  (JP) .............................. JP2017-088716

(51) Int. Cl.
*H02P 27/14*   (2006.01)
*H02P 3/08*    (2006.01)
(Continued)

(52) U.S. Cl.
CPC ........... *H02K 29/08* (2013.01); *H02K 11/215* (2016.01); *H02P 6/10* (2013.01)

(58) Field of Classification Search
CPC .................................. H02P 6/182; H02P 6/16
See application file for complete search history.

(56) References Cited

U.S. PATENT DOCUMENTS

2002/0074886 A1* 6/2002 Harada ................. H02K 23/04
                                                  310/154.23
2008/0079380 A1* 4/2008 Knittel ...................... G01P 3/48
                                                     318/490
(Continued)

FOREIGN PATENT DOCUMENTS

JP    2005-261134    9/2005
JP    2005-323488   11/2005
(Continued)

OTHER PUBLICATIONS

International Search Report dated Jul. 3, 2018 in PCT/JP2018/016644 filed on Apr. 24, 2018.

*Primary Examiner* — Muhammad S Islam
*Assistant Examiner* — Charles S Laughlin
(74) *Attorney, Agent, or Firm* — IPUSA, PLLC

(57) ABSTRACT

A motor module includes a motor and a rotation angle detector including a rotation angle calculator that calculates a rotation angle based on a voltage and an electric current of the motor, a first signal generator that generates a first signal based on a ripple component included in the electric current, an operation part that corrects the rotation angle based on the first signal and the rotation angle, and a rotation information calculator that calculates information on rotation of the motor based on an output from the operation part. The operation part outputs, to the rotation angle calculator, a command to correct the rotation angle when the first signal is generated for the first time while the rotation angle is within a predetermined angle range, and ignores the first signal that is generated for the second or subsequent time while the rotation angle is within the predetermined angle range.

15 Claims, 22 Drawing Sheets

(51) Int. Cl.
*H02P 3/14* (2006.01)
*H02K 29/08* (2006.01)
*H02K 11/215* (2016.01)
*H02P 6/10* (2006.01)

(56) References Cited

U.S. PATENT DOCUMENTS

| | | | |
|---|---|---|---|
| 2009/0254300 A1* | 10/2009 | Schneider | H02P 7/2805 |
| | | | 702/145 |
| 2015/0349617 A1 | 12/2015 | Roos | |
| 2017/0047872 A1 | 2/2017 | Spenninger et al. | |

FOREIGN PATENT DOCUMENTS

| | | |
|---|---|---|
| JP | 2010-033513 | 2/2010 |
| JP | 2010-130727 | 6/2010 |

\* cited by examiner

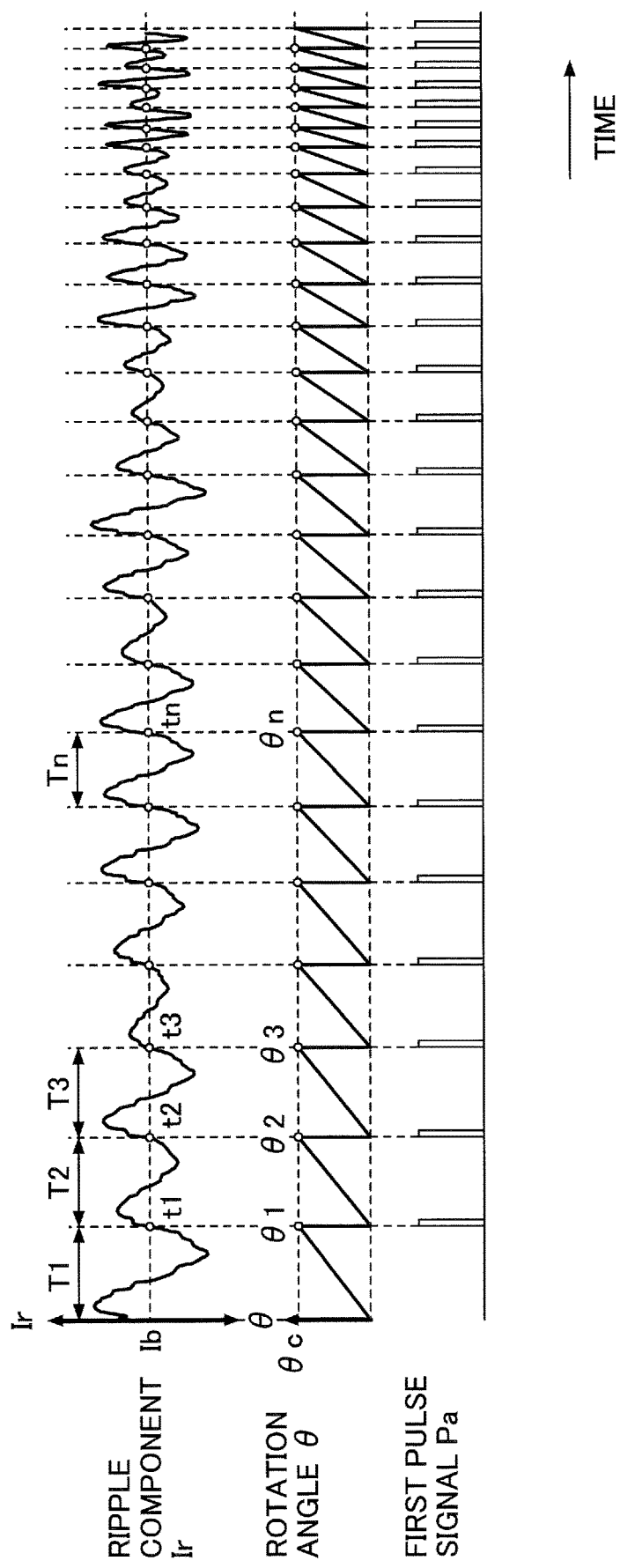

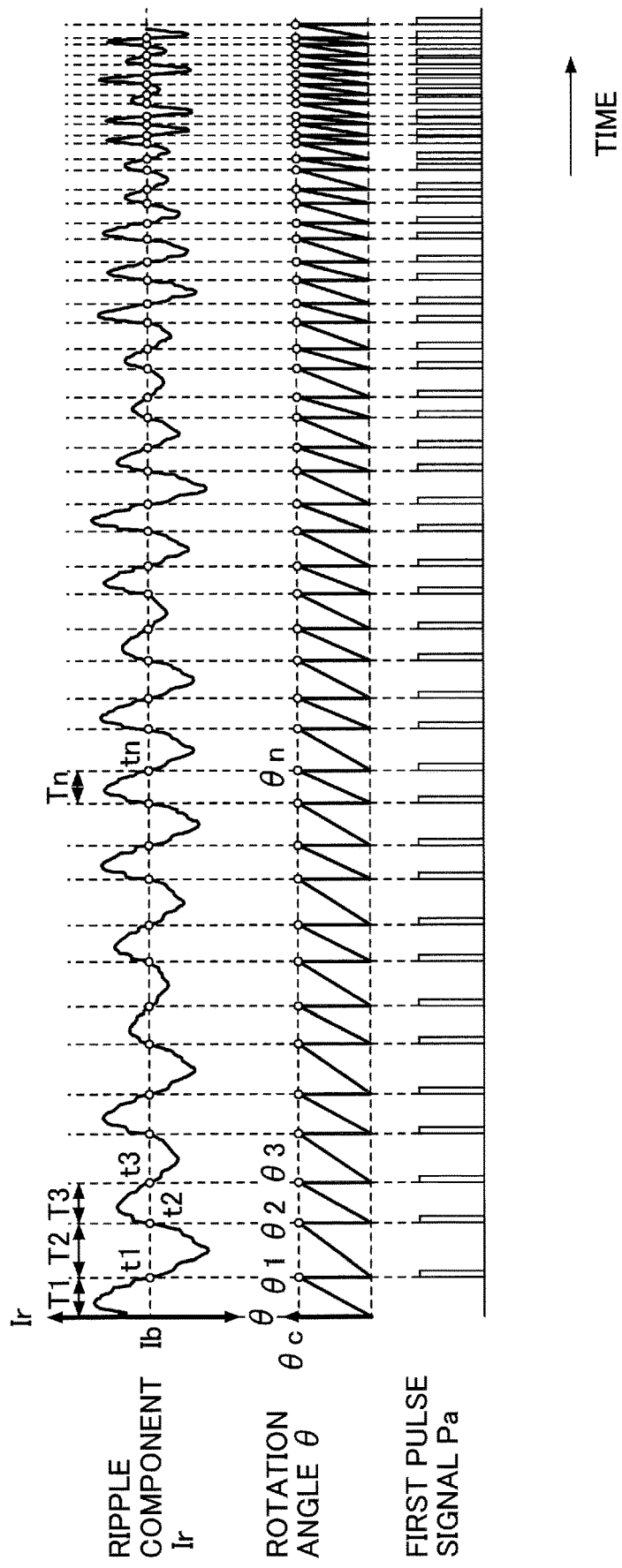

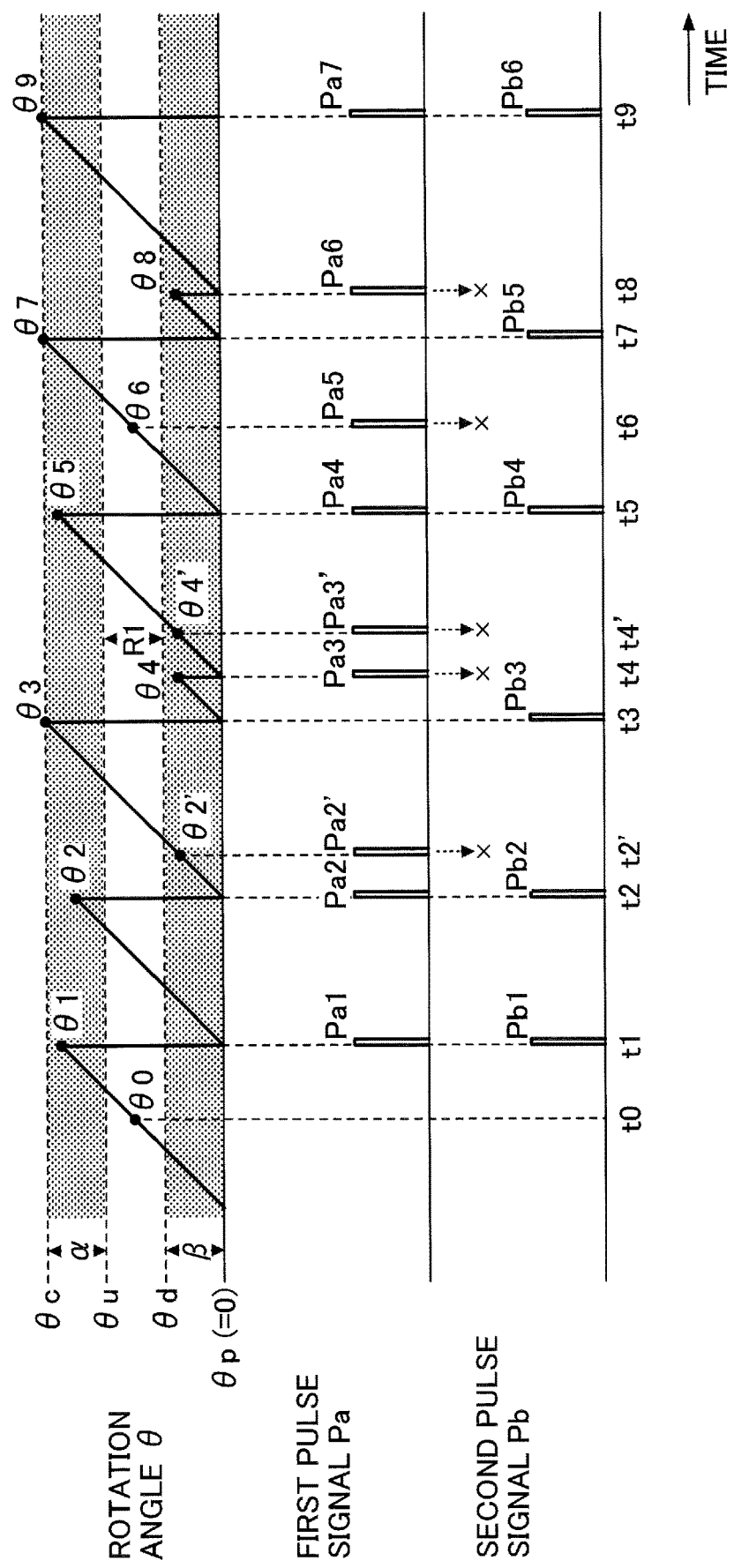

MOTOR MODULE, ROTATION ANGLE DETECTOR, AND METHOD FOR DETECTING ROTATION ANGLE OF MOTOR

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/016644, filed on Apr. 24, 2018, which is based on and claims priority to Japanese Patent Application No. 2017-088716 filed on Apr. 27, 2017, the entire contents of which are incorporated herein by reference.

BACKGROUND OF THE INVENTION

1. Field of the Invention

An aspect of this disclosure relates to a motor module, a rotation angle detector, and a method for detecting a rotation angle of a motor.

2. Description of the Related Art

Japanese Laid-Open Patent Publication No. 2005-261134 discloses an apparatus that obtains a rotation amount of a motor based on the ripple component included in an electric current flowing through the motor to detect the rotation angle of the motor without using a position detecting sensor. This apparatus generates pulse signals having a frequency that is the same as the frequency of the ripple component, and counts the number of the pulse signals to obtain the rotation amount of the motor. Thus, this apparatus can obtain the rotation amount with certain accuracy while the motor is rotating at a constant rotational angular velocity. However, when, for example, the motor is rotating by inertia after the power is turned off and the ripple component is becoming small, the apparatus cannot obtain the rotation amount with accuracy.

Japanese Laid-Open Patent Publication No. 2005-323488 discloses an apparatus that can more accurately obtain the rotation amount of a motor when the ripple component is small. This apparatus can accurately obtain the rotation amount of a motor by correcting the number of pulse signals based on an integral of a counter electromotive voltage calculated based on an electric current flowing through the motor and a voltage between terminals of the motor.

Specifically, when an actual integral obtained when a pulse signal is generated is significantly smaller than an average integral during one period of a ripple component, the apparatus treats the pulse signal as an error pulse and decrements the number of pulse signals. Also, when an actual integral obtained after a predetermined time from when the previous pulse signal is generated is significantly greater than the average integral, the apparatus determines that there has been a failure in generating a pulse signal and increments the number of pulse signals.

However, the apparatus described in Japanese Laid-Open Patent Publication No. 2005-323488 cannot increment the number of pulse signals until a period of time, which is sufficient to indicate the stop of the motor, passes. Therefore, the apparatus may not be able to obtain an accurate rotation amount at an appropriate timing and may not be able to obtain a reliable rotation amount.

SUMMARY OF THE INVENTION

In an aspect of this disclosure, there is provided a motor module including a motor and a rotation angle detector that detects a rotation angle of the motor. The motor includes a commutator including multiple commutator segments. The rotation angle detector includes a rotation angle calculator that calculates the rotation angle based on an inter-terminal voltage between terminals of the motor and an electric current flowing through the motor and outputs a rotation angle signal indicating the rotation angle, a first signal generator that generates a first signal based on a ripple component included in the electric current flowing through the motor, an operation part that corrects the rotation angle based on both of the first signal and the rotation angle signal, and a rotation information calculator that calculates information on rotation of the motor based on an output from the operation part. The operation part outputs, to the rotation angle calculator, a command to correct the rotation angle to a first angle within a predetermined angle range when the first signal is generated for the first time while the rotation angle is within the predetermined angle range, and ignores the first signal that is generated for the second or subsequent time while the rotation angle is within the predetermined angle range.

BRIEF DESCRIPTION OF THE DRAWINGS

FIG. 3A is a timing chart illustrating an example of timings at which a first signal generator generates first pulse signals;

FIG. 3B is a timing chart illustrating another example of timings at which the first signal generator generates first pulse signals;

FIG. 4 is a timing chart illustrating an example of timings at which second pulse signals are generated;

DESCRIPTION OF THE PREFERRED EMBODIMENTS

Figure 1:
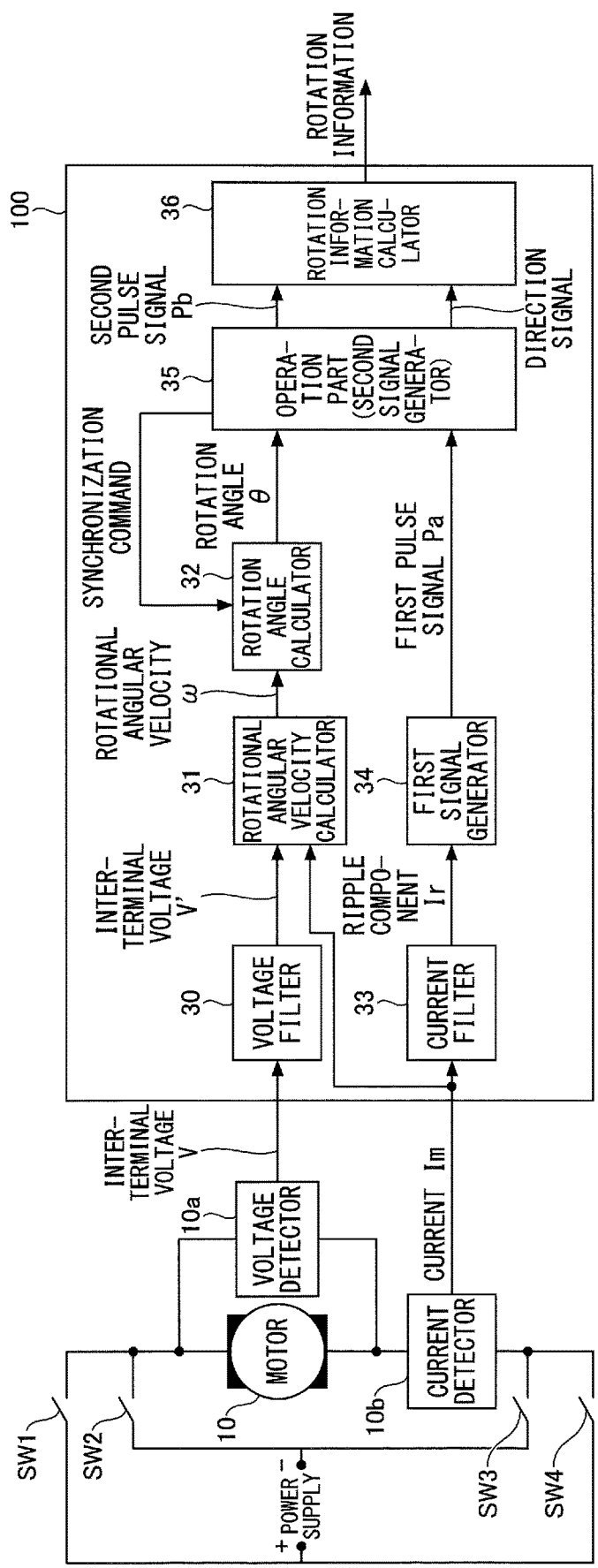
FIG. 1 is a block diagram illustrating an example of a configuration of a rotation angle detector according to an embodiment.

A rotation angle detector 100 according to an embodiment is described below with reference to drawings. FIG. 1 is a block diagram illustrating an example of a configuration of the rotation angle detector 100 according to the embodiment.

The rotation angle detector 100 detects a rotation angle of a motor 10. In the example of FIG. 1, the rotation angle detector 100 detects a rotation angle of the motor 10 based on an inter-terminal voltage V between terminals of the motor 10 and a current Im flowing through the motor 10. Here, the rotation angle detector 100 may be attached to the motor 10, and the motor 10 and the rotation angle detector 100 may be collectively referred to as a "motor module".

The motor 10 is a direct current (DC) commutator motor including a commutator. The motor 10 is used, for example, to move a vehicle window up and down, to adjust the angle of a door mirror, to adjust the amount of air output from an air conditioner, and to adjust the optical axis of a headlight.

Figure 2:
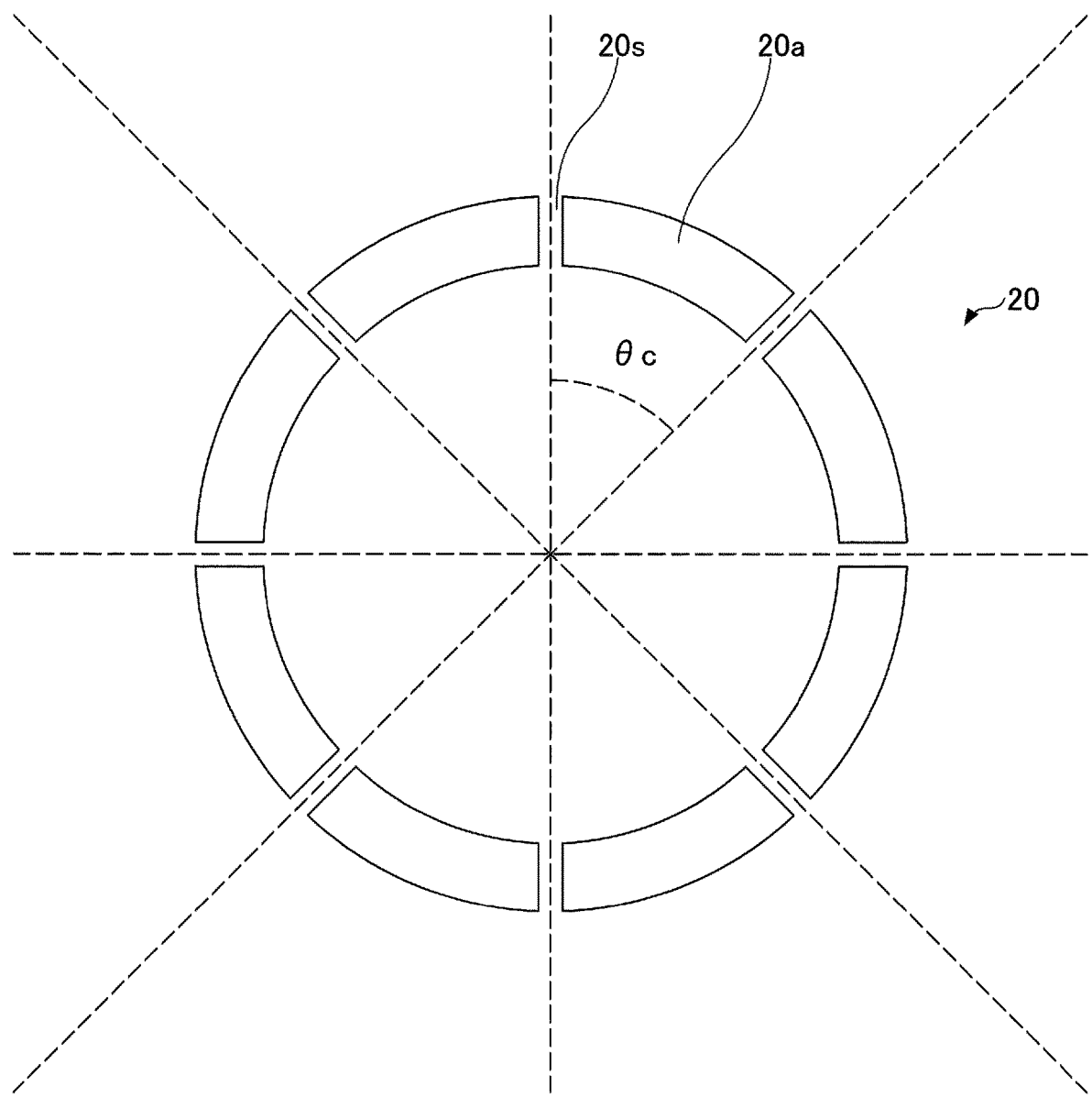
FIG. 2 is a schematic diagram of a commutator.

FIG. 2 is a schematic diagram of a commutator 20. As illustrated in FIG. 2, the commutator 20 includes eight commutator segments 20a that are separated from each other by slits 20s. An inter-slit angle θc (second angle θc), which is the central angle of an arc formed by each commutator segment 20a, is about 45 degrees.

The motor 10 is connected to a power supply via four switches SW1 through SW4. The motor 10 rotates clockwise or forward when the switch SW1 and the switch SW3 are closed, and rotates counterclockwise or backward when the switch SW2 and the switch SW4 are closed. In the example of FIG. 1 where the motor 10 is connected to the power supply, an electric current flowing through the motor 10 rotating forward has a positive value, and an electric current flowing through the motor 10 rotating backward has a negative value. While the motor 10 is rotating by inertia, the switch SW2 and the switch SW3 are closed, an electric current flowing through the motor 10 rotating forward has a negative value, and an electric current flowing through the motor 10 rotating backward has a positive value. In the present embodiment, the motor 10 and a current detector 10b are in a closed loop so that a rotation during the inertial rotation can be detected. In the present embodiment, because the electrical resistance of the motor 10 is sufficiently high, the motor 10 rotates by inertia even if the two terminals of the motor 10 are short-circuited. On the other hand, if the electrical resistance of the motor 10 is low, the motor 10 quickly decelerates when the two terminals of the motor 10 are short-circuited. To suppress the deceleration of the motor 10 during inertial rotation, a closed loop passing through a resistor may be formed.

A voltage detector 10a detects the inter-terminal voltage V of the motor 10. A current detector 10b detects the current Im flowing through the motor 10.

The rotation angle detector 100 includes a voltage filter 30, a rotational angular velocity calculator 31, a rotation angle calculator 32, a current filter 33, a first signal generator 34, a second signal generator 35, and a rotation information calculator 36. These components may be implemented by electric circuits or by software.

The voltage filter 30 smooths the waveform of the inter-terminal voltage V output from the voltage detector 10a. For example, the voltage filter 30 smooths the waveform of the inter-terminal voltage V so that the rotational angular velocity calculator 31 can accurately calculate the rotational angular velocity of the motor 10. In the example of FIG. 1, the voltage filter 30 is a low-pass filter and outputs an inter-terminal voltage V' that is obtained by removing, as noise, a high frequency component of the waveform of the inter-terminal voltage V output from the voltage detector 10a.

The rotational angular velocity calculator 31 calculates the rotational angular velocity of the motor 10 based on the inter-terminal voltage V' of the motor 10 and the current Im flowing through the motor 10. In the example of FIG. 1, the rotational angular velocity calculator 31 calculates a rotational angular velocity ω according to formula (1) below.

$$\omega = \frac{1}{Ke} \times \left(V' - Im \times Rm - Lm \times \frac{dIm}{dt}\right) \quad (1)$$

In formula (1), Ke indicates a counter electromotive voltage constant, Rm indicates an internal resistance of the motor 10, Lm indicates an inductance of the motor 10, and dIm/dt indicates a one-time differential of the current Im. The one-time differential of the current Im is, for example, a difference between the previous value of the current Im and the current value of the current Im.

The rotational angular velocity calculator 31 calculates the rotational angular velocity ω of the motor 10 at each regular control period, and outputs the calculated rotational angular velocity ω to the rotation angle calculator 32.

The rotation angle calculator 32 calculates a rotation angle of the motor 10. The rotation angle calculator 32 calculates a rotation angle θ according to formula (2) below.

$$\theta = \int_0^t \theta \times dt \quad (2)$$

For example, the rotation angle calculator 32 calculates the rotation angle θ by integrating the rotational angular velocities co output from the rotational angular velocity calculator 31 at regular control periods, and outputs a rotation angle signal indicating the calculated rotation angle θ to the second signal generator 35.

Also, the rotation angle calculator 32 resets the rotation angle θ to zero in response to a synchronization command from the second signal generator 35.

The current filter 33 outputs a ripple component Ir that is a specific frequency component included in the current Im output from the current detector 10b. The current filter 33 is implemented by a bandpass filter that passes a frequency of the ripple component Ir so that the first signal generator 34 can detect the ripple component Ir of the current Im. The current filter 33, which is implemented by a bandpass filter, removes frequency components other than the ripple component Ir from the waveform of the current Im output from the current detector 10b. The ripple component Ir used in the present embodiment is generated when the commutator segments 20a and the brush contact and separate from each other. Therefore, the angle that the motor 10 rotates during one period of the ripple component Ir equals the inter-slit angle θc.

The first signal generator 34 generates a signal that is estimated based on the waveform of the ripple component Ir and indicates that the motor 10 has rotated by a predetermined angle. This signal is generated at the timing corresponding to the period of the ripple component Ir. The predetermined angle may correspond to one period or a half period of the ripple component Ir. In the present embodiment, each time the motor 10 rotates by the inter-slit angle (the second angle θc), the first signal generator 34 generates a signal (the first pulse signal Pa) estimated based on the waveform of the ripple component Ir. The first signal generator 34 generates the first pulse signal Pa based on the waveform of the ripple component Ir output from the current filter 33.

FIG. 3A is a timing chart illustrating an example of timings at which the first signal generator 34 generates the first pulse signals Pa. The first signal generator 34 generates the first pulse signal Pa for each period of the ripple component Ir. For example, the first signal generator 34 generates the first pulse signal Pa each time the ripple component Ir exceeds a reference current value Ib. In the example of FIG. 3A, the first signal generator 34 generates first pulse signals Pa at times t1, t2, t3, . . . , and tn. Each of T1, T2, T3, . . . , and Tn indicates a period of the ripple component Ir; and each of θ1, θ2, θ3, . . . , and θn indicates the rotation angle θ at the time when the first signal generator 34 generates the first pulse signal Pa. The rotation angle θ is calculated by the rotation angle calculator 32. Thus, the first signal generator 34 typically generates the first pulse signal Pa each time the rotation angle θ increases by the inter-slit angle.

Here, when, for example, the current Im and its ripple component Ir become small in an inertial rotation period after the motor 10 is powered off, the first signal generator 34 may not be able to detect the ripple component Ir and generate the first pulse signal Pa. Also, when, for example, a rush current is generated immediately after the motor 10 is powered on, the first signal generator 34 may erroneously generate the first pulse signal Pa according to the rush current. Such a generation failure and erroneous generation of the first pulse signal Pa may reduce the reliability of information (rotation information) on the rotation of the motor 10 output by the rotation angle detector 100.

For the above reason, the rotation angle detector 100 includes the second signal generator 35 that can more accurately generate a signal indicating the rotation angle of the motor 10.

The second signal generator 35 is an example of an operation part and generates a signal indicating that the motor 10 has rotated by an inter-slit angle. The second signal generator 35 generates the second pulse signal Pb for each inter-slit angle based on the rotation angle signal output from the rotation angle calculator 32 and the first pulse signal Pa output from the first signal generator 34. The second pulse signal Pb is an example of information indicating that the motor 10 has rotated by a predetermined angle. Because the first pulse signal Pa is estimated based solely on the waveform of the ripple component Ir, the first pulse signal Pa tends to be output erroneously. On the other hand, because the second pulse signal Pb is estimated based on both of the first pulse signal Pa and the rotation angle signal, an error in the second pulse signal Pb can be contained within a given value.

FIG. 4 is a timing chart illustrating an example of timings at which the second signal generator 35 generates the second pulse signals Pb. In the example of FIG. 4, a first angle θp is zero. In another example, the first angle θp is other than zero. A second angle θc is the same as the inter-slit angle of the motor 10. A third angle θu and a fourth angle θd are thresholds for determining whether the first pulse signal Pa is acceptable and are set based on the maximum phase difference between the rotation angle θ and the actual rotation angle of the motor 10 at the time when the rotation angle θ becomes the first angle θp.

The second signal generator 35 generates the second pulse signal Pb based on the initial first pulse signal Pa that is generated by the first signal generator 34 for the first time while the rotation angle θ is greater than or equal to the third angle θu and less than the second angle θc. The third angle θu may be set in advance or may be set dynamically. In FIG. 4, an acceptable range where the rotation angle θ is greater than or equal to the third angle θu and less than the second angle θc is indicated by a dot pattern. In the example of FIG. 4, rotation angles θ1, θ2, and θ5 at times when the first signal generator 34 generates first pulse signals Pa1, Pa2, and Pa4 are greater than or equal to the third angle θu and are less than the second angle θc. That is, the remaining angle necessary for each of the rotation angles θ1, θ2, and θ5 to reach the second angle θc is less than an angle α. The angle α is set based on the maximum difference between the rotation angle θ and the actual rotation angle of the motor 10 at the time when the rotation angle θ is the first angle θp. In this case, the second signal generator 35 assumes that the first pulse signals Pa1, Pa2, and Pa4 generated by the first signal generator 34 at times t1, t2, and t5 are not noise. Therefore, the second signal generator 35 generates second pulse signals Pb1, Pb2, and Pb4 at times t1, t2, and t5. After generating the second pulse signal Pb, the second signal generator 35 outputs a synchronization command to the rotation angle calculator 32. Here, if noise having the same frequency component as the ripple component Ir is generated when the rotation angle θ is less than the second angle θc and greater than or equal to the third angle θu, an erroneous first pulse signal Pa may be output and the second pulse signal Pb may be generated. However, at the next timing, a true ripple component Ir is detected, and the rotation angle detector 100 can detect a correct rotation angle. Accordingly, even if an erroneous rotation angle is temporarily detected by the rotation angle detector 100 due to noise, the rotation angle returns to a correct value. Also, the error is less than the angle α and is practically acceptable.

The second signal generator 35 also generates the second pulse signal Pb when the rotation angle θ reaches the second angle θc. However, the rotation angle θ is calculated by the rotation angle calculator 32 and includes an error. In the example of FIG. 4, the second signal generator 35 generates second pulse signals Pb3, Pb5, and Pb6 when the absolute values of the rotation angles θ3, θ7, and θ9 reach the second angle θc at times t3, t7, and t9. After generating the second pulse signal Pb, the second signal generator 35 outputs a synchronization command to the rotation angle calculator 32. When receiving the synchronization command, the rotation angle calculator 32 resets the rotation angle θ to zero.

That is, the second signal generator 35, for example, generates the second pulse signal Pb3 if the absolute value of the rotation angle θ reaches the second angle θc after generating the second pulse signal Pb2 at time t2 and before receiving the first pulse signal Pa.

Thus, the second signal generator 35 generates the second pulse signal Pb as long as the absolute value of the rotation angle θ calculated by the rotation angle calculator 32 reaches the second angle θc even if the first pulse signal Pa is not generated for some reason. This configuration makes it possible to reliably prevent the generation failure of the first pulse signal Pa.

On the other hand, the second signal generator 35 does not generate the second pulse signal Pb if the rotation angle θ received when the first pulse signal Pa is generated by the first signal generator 34 is less than the fourth angle θd. The fourth angle θd may be set in advance or may be set dynamically. Typically, the above situation occurs after the rotation angle θ reaches the predetermined angle and the second pulse signal Pb is generated. In FIG. 4, an acceptable range where the rotation angle θ is greater than or equal to the first angle θp (zero) and less than the fourth angle θd is indicated by a dot pattern. In the example of FIG. 4, the first signal generator 34 generates the first pulse signal Pa3 at a time t4 that is after the absolute value of the rotation angle θ reaches the second angle θc at time t3 and the second pulse signal Pb3 is generated. At time t4, a rotation angle θ4 is less than the fourth angle θd. That is, the rotation angle θ4 calculated after the rotation angle θ is reset at time t3 is still less than an angle β. In this case, the second signal generator 35 can determine that the first pulse signal Pa3 generated by the first signal generator 34 at time t4 can be integrated with the second pulse signal Pb3 generated at time t3. Specifically, this event occurs when the rotation angle θ output from the rotation angle calculator 32 reaches the second angle θc before the actual rotation angle of the motor 10 reaches the second angle θc. That is, this event occurs when the second pulse signal Pb3 is generated because the rotation angle θ calculated by the rotation angle calculator 32 reaches the second angle θc even though the actual rotation angle has not reached the second angle θc. The time when the first pulse signal Pa3 is generated immediately after the generation of the second pulse signal Pb3 corresponds to the moment when the actual rotation angle reaches the second angle θc. Therefore, the second signal generator 35 outputs a synchronization command to the rotation angle calculator 32 when the first pulse signal Pa3 is generated. In this case, the second signal generator 35 does not generate the second pulse signal Pb at time t4. In FIG. 4, a dotted arrow leading to "X" indicates that the second pulse signal Pb was not generated based on the first pulse signal Pa3. The same applies to the dotted arrows leading to "X" in other figures.

Also, there is a case where the first signal generator 34 consecutively generates first pulse signals Pa in a short period of time. As described above, the first signal generator 34 generates the first pulse signal Pa each time the ripple component Ir exceeds the reference current value Ib. Immediately before or after the ripple component Ir exceeds the reference current value Ib, the first pulse signal Pa is erroneously generated even when small noise is superimposed. In this case, the interval at which the first signal generator 34 generates the first pulse signal Pa becomes less than the angle β (the fourth angle θd). In the example of FIG. 4, the first signal generator 34 generates the first pulse signal Pa2 at time t2. The second signal generator 35 generates the second pulse signal Pb2 and outputs the synchronization command to the rotation angle calculator 32. The rotation angle calculator 32 resets the rotation angle θ. Then, at a time t2', the first signal generator 34 generates a first pulse signal Pa2'. The rotation angle θ at time t2' is less than the fourth angle θd. In this case, the second signal generator 35 does not generate the second pulse signal Pb and does not output the synchronization command. In FIG. 4, a dotted arrow leading to "X" indicates that the second pulse signal Pb was not generated based on the first pulse signal Pa3. Here, if small noise is superimposed immediately before or after the ripple component Ir exceeds the reference current value Ib, it is difficult to determine which one of multiple first pulse signals Pa generated consecutively in a short period of time indicates that the rotation angle θ has reached the second angle θc. In this case, however, because the multiple first pulse signals Pa are generated within a short period of time (less than the angle β), there is no practical problem even if it is assumed that the rotation angle θ has reached the second angle θc when the initial first pulse signal Pa is generated. Also, even if similar noise is generated each time the ripple component Ir exceeds the reference current value Ib, the error is kept less than the angle β. In other words, errors are not accumulated. Therefore, the error can be kept within a practically acceptable range.

Also, if the rotation angle θ, which is received when the first pulse signal Pa is generated by the first signal generator 34, is greater than or equal to the fourth angle θd and less than the third angle θu, i.e., if the rotation angle θ is within an angle range R1, the second signal generator 35 neither generates the second pulse signal Pb nor outputs the synchronization command to the rotation angle calculator 32. In the example of FIG. 4, a rotation angle θ6 received when a first pulse signal Pa5 is generated by the first signal generator 34 at a time t6 is greater than or equal to the fourth angle θd and less than the third angle θu. That is, the remaining angle necessary for the rotation angle θ6 to reach the second angle θc is greater than the angle α, and the rotation angle θ6 calculated after the rotation angle θ is reset at time t5 is greater than or equal to the angle β. In this case, the second signal generator 35 can determine that the first pulse signal Pa5 is based on noise. Accordingly, at time t6, the second signal generator 35 neither generates the second pulse signal Pb nor outputs the synchronization command to the rotation angle calculator 32. This configuration makes it possible to eliminate the influence of the first pulse signal Pa5 that is based on noise.

Also, the second signal generator 35 does not generate the second pulse signal Pb if the rotation angle θ received when the first pulse signal Pa is generated by the first signal generator 34 is less than the fourth angle θd. On the other hand, when the rotation angle θ, which is received when the first pulse signal Pa is generated by the first signal generator 34, is less than the fourth angle θd, there is a case where the second signal generator 35 outputs the synchronization command to the rotation angle calculator 32 and a case where the second signal generator 35 does not output the synchronization command to the rotation angle calculator 32. If the first pulse signal Pa is generated when the rotation angle θ is less than the fourth angle θd after the rotation angle θ reaches the second angle θc before the generation of the first pulse signal Pa, the second signal generator 35 transmits a synchronization command to the rotation angle calculator 32. However, if multiple first pulse signals Pa are generated while the rotation angle θ is less than the fourth angle θd after the rotation angle θ reaches the second angle θc before the generation of the first pulse signal Pa, the second and subsequent first pulse signals Pa generated for the second and subsequent times are ignored. That is, the second signal generator 35 does not output the synchronization command. Also, even if the first pulse signal Pa is generated when the rotation angle θ is less than the fourth angle θd after the first pulse signal Pa is generated before the rotation angle θ reaches the second angle θc, the second signal generator 35 does not output the synchronization command. That is, if multiple first pulse signals Pa are generated while the rotation angle θ is less than the fourth angle θd (angle β), the second and subsequent first pulse signals Pa generated for the second and subsequent times are ignored. That is, the second signal generator 35 does not output the synchronization command. In the example of FIG. 4, a rotation angle θ4', which is received when the first signal generator 34 generates a first pulse signal Pa3' at a time t4', is less than the fourth angle θd. However, the first pulse signal Pa3' is the second first pulse signal Pa generated after the latest second pulse signal Pb3 is generated. Therefore, when receiving the first pulse signal Pa3', the second signal generator 35 does not generate the second pulse signal Pb and does not output the synchronization command to the rotation angle calculator 32.

With the above configuration, the rotation angle detector 100 can keep the detection error in the rotation angle θ of the motor 10 within a practically acceptable range. Particularly, in the rotation angle detector 100, errors are not accumulated. For this reason, errors can be kept within a predetermined range regardless of the rotation speed of the motor 10. The inventors have found out the following conditions and invented the rotation angle detector 100 described above. (1) False detection of the ripple component Ir due to small noise is limited to a timing immediately before or after the ripple component Ir exceeds the reference current value Ib. In this case, an erroneous first pulse signal Pa is generated only in a short period of time before and after the correct generation of the first pulse signal Pa (the angle α before the correct generation and the angle β after the correct generation). (2) Large noise is generated by, for example, a rush current generated immediately after power is turned on, and is generated at an interval that is sufficiently longer than the second angle θc. (3) An error in the rotation angle θ calculated by the rotation angle calculator 32 based on the inter-terminal voltage V' and the current Im is sufficiently smaller than the inter-slit angle (the second angle θc).

With the above configuration, for example, the second signal generator 35 can generate the second pulse signal Pb even when the current Im and its ripple component Ir become small in an inertial rotation period after the motor 10 is powered off and the first signal generator 34 cannot generate the first pulse signal Pa based on the waveform of the ripple component Ir.

Also, for example, even when a rush current is generated immediately after the motor 10 is powered on and the first signal generator 34 erroneously generates the first pulse signal Pa according to the rush current, the second signal generator 35 does not generate the second pulse signal Pb corresponding to the first pulse signal Pa. This configuration makes it possible to eliminate the influence of the erroneously-generated first pulse signal Pa.

Also, for example, even when the first signal generator 34 erroneously generates the first pulse signal Pa due to the influence of noise, the second signal generator 35 does not generate the second pulse signal Pb corresponding to the first pulse signal Pa and does not output the synchronization command to the rotation angle calculator 32.

The rotation angle detector 100 calculates rotation information of the motor 10 based on the second pulse signal Pb that is generated based on both of the first pulse signal Pa and the rotation angle signal. This configuration makes it possible to improve the reliability of the rotation information of the motor 10.

The second signal generator 35 also outputs a direction signal indicating the rotation direction of the motor 10. For example, the second signal generator 35 outputs a positive value as the rotation angle θ when the rotation direction is the forward rotation direction and outputs a negative value as the rotation angle θ when the rotation direction is the backward rotation direction. The rotation angle θ takes a positive value when the electric current flowing through the motor 10 is positive and takes a negative value when the electric current flowing through the motor 10 is negative. During inertial rotation, however, the rotation angle θ takes a positive value when the electric current flowing through the motor 10 is negative and takes a negative value when the electric current flowing through the motor 10 is positive.

The rotation information calculator 36 calculates rotation information of the motor 10. The rotation information of the motor 10 includes, for example, a rotation amount (rotation angle) from a reference rotation position and the number of rotations from the reference rotation position. When the motor 10 is used to move a vehicle window up and down, the rotation information of the motor 10 may be converted into a relative position of the upper edge of the window relative to a reference position and/or an opening amount of the window. The rotation information may also include statistics such as an average, the largest value, the smallest value, and a mean value of the rotational angular velocity ω in a given period. In the example of FIG. 1, the rotation information calculator 36 calculates rotation information of the motor 10 based on outputs from the second signal generator 35. For example, the rotation information calculator 36 calculates the rotation amount after the start of rotation of the motor 10 by multiplying the number of the second pulse signals Pb generated after the start of rotation of the motor 10 by the second angle θc. In this process, the rotation information calculator 36 determines whether to increment or decrement the number of the second pulse signals Pb based on a direction signal output from the second signal generator 35 together with the second pulse signal Pb. Alternatively, the rotation information calculator 36 may separately count the number of second pulse signals Pb received together with direction signals indicating the forward rotation direction and the number of second pulse signals Pb received together with direction signals indicating the backward rotation direction, and calculate the rotation amount of the motor 10 based the difference between the counted numbers.

Figure 5:
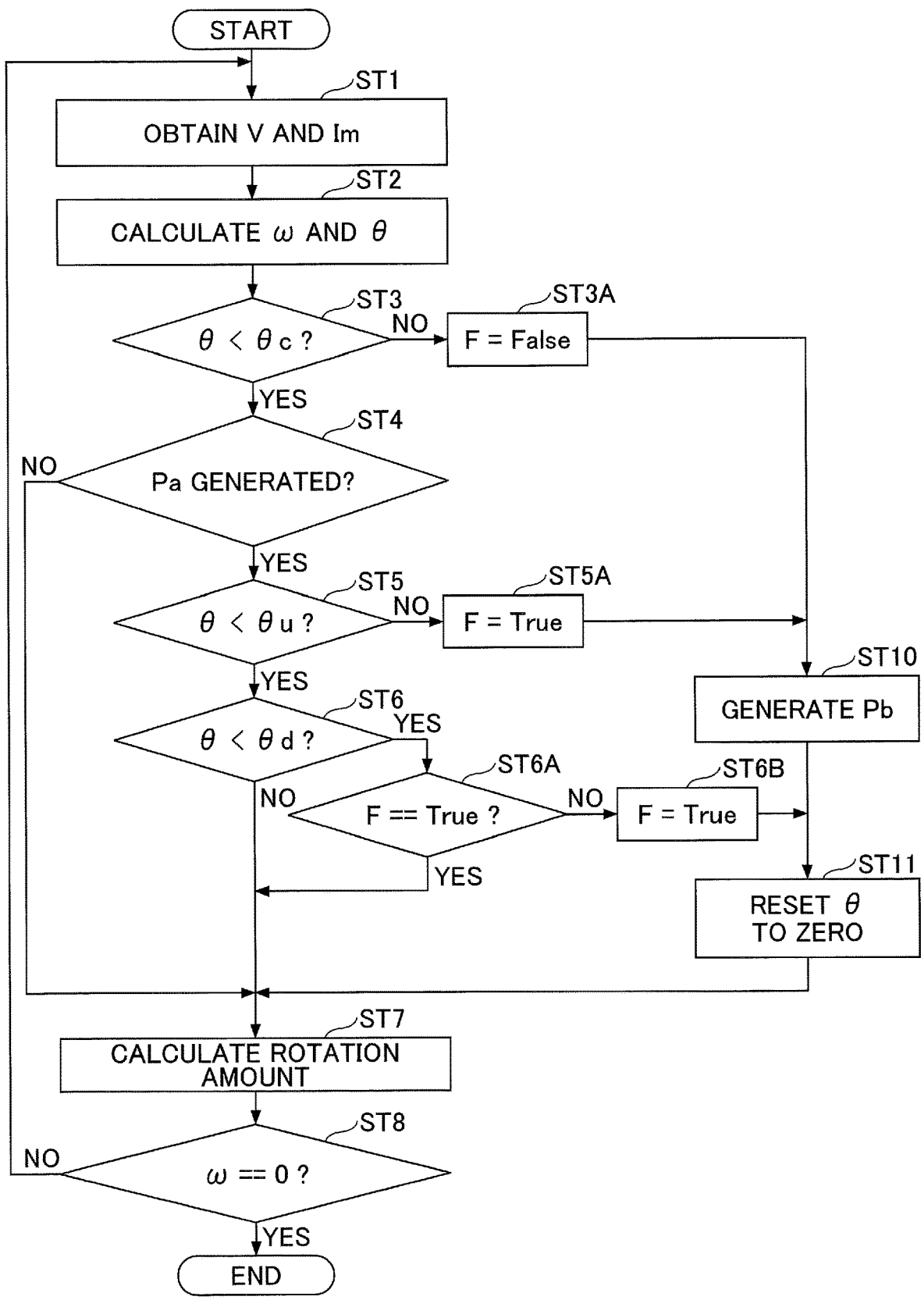
FIG. 5 is a flowchart illustrating a rotation-amount calculation process.

Next, a process (which is hereafter referred to as a "rotation-amount calculation process") performed by the rotation angle detector 100 to calculate a rotation amount of the motor 10 is described with reference to FIG. 5. FIG. 5 is a flowchart illustrating the rotation-amount calculation process. The rotation angle detector 100 performs the rotation-amount calculation process while the motor 10 is being driven.

First, the rotation angle detector 100 obtains the inter-terminal voltage V and the current Im (step ST1). In the example of FIG. 1, the rotation angle detector 100 obtains the inter-terminal voltage V output from the voltage detector 10a and the current Im output from the current detector 10b at each predetermined control period.

Next, the rotation angle detector 100 calculates the rotational angular velocity ω and the rotation angle θ (step ST2). In the example of FIG. 1, the rotational angular velocity calculator 31 of the rotation angle detector 100 calculates the rotational angular velocity ω at each predetermined control period by inserting the inter-terminal voltage V' and the current Im in formula (1). Then, the rotation angle calculator 32 of the rotation angle detector 100 calculates the rotation angle θ by integrating rotational angular velocities ω calculated at the respective control periods.

Next, the rotation angle detector 100 determines whether the rotation angle θ is less than the second angle θc (step ST3). In the example of FIG. 1, the second signal generator 35 of the rotation angle detector 100 determines whether the rotation angle θ is less than the second angle θc (inter-slit angle).

When it is determined that the rotation angle θ is greater than or equal to the second angle θc (NO at step ST3), the second signal generator 35 determines that the first pulse signal Pa has not been generated at a timing before the rotation angle θ reaches the second angle θc. In this case, the second signal generator 35 sets a flag F to False to indicate that the first pulse signal Pa has not been generated (step ST3A). The flag F indicates whether the first pulse signal Pa has been generated. The initial value of the flag F is False indicating that the first pulse signal Pa has not been generated. If the flag F is set to True, it indicates that the first pulse signal Pa has already been generated. Then, the second signal generator 35 generates the second pulse signal Pb (step ST10), and resets the rotation angle θ to zero (step ST11). This corresponds to a case where the rotation angle θ reaches the second angle θc before the first pulse signal Pa is generated, and corresponds to each of cases in the example of FIG. 4 where the rotation angle θ reaches the rotation angles θ3, θ7, and θ9 at times t3, t7, and t9, respectively.

On the other hand, When it is determined that the rotation angle θ is less than the second angle θc (YES at step ST3), the second signal generator 35 determines whether the first pulse signal Pa has been generated (step ST4). In the example of FIG. 1, the second signal generator 35 determines whether the first pulse signal Pa has been generated by the first signal generator 34.

When the second signal generator 35 determines that the first pulse signal Pa has not been generated (NO at step ST4) in a stage where the rotation angle θ is less than the second angle θc (YES at step ST3), the rotation angle detector 100 calculates a rotation amount (step ST7). Then, the rotation information calculator 36 calculates a rotation amount of the motor 10 based on outputs from the second signal generator 35. In this case, there is no change in the calculated rotation amount. This corresponds to a case in the example of FIG. 4 where the rotation angle θ is the rotation angle θ0 at time t0.

Next, the rotation angle detector 100 determines whether the rotational angular velocity ω has become zero (step ST8). When it is determined that the rotational angular velocity ω has not become zero (NO at step ST8), the rotation angle detector 100 returns to step ST1. When it is determined that the rotational angular velocity ω has become zero (YES at step ST8), the rotation angle detector 100 ends the rotation-amount calculation process.

When it is determined that the first pulse signal Pa has been generated (YES at step ST4), the second signal generator 35 determines whether the rotation angle θ is less than the third angle θu (step ST5). This is because the first pulse signal Pa generated at a timing at which the rotation angle θ is less than the third angle θu is highly probably generated based on noise.

When it is determined that the rotation angle θ is greater than or equal to the third angle θu (NO at step ST5), the second signal generator 35 sets the flag F, which indicates whether the first pulse signal Pa has been generated, to True (step ST5A). Then, the second signal generator 35 generates the second pulse signal Pb (step ST10), and resets the rotation angle θ to zero (step ST11). This is because if the first pulse signal Pa is generated when the rotation angle θ is greater than or equal to the third angle θu, the actual rotation angle at the time when the first pulse signal Pa is generated is close to the second angle θc. This corresponds to each of the cases in the example of FIG. 4 where the first pulse signals Pa1, Pa2, and Pa4 are generated at times t1, t2, and t5.

When it is determined that the rotation angle θ is less than the third angle θu (YES at step ST5), the second signal generator 35 cannot determine at this timing that the first pulse signal Pa is not based on noise. The rotation angle θ may have a certain level of error. Also, the generation timing of the first pulse signal Pa may be slightly changed due to, for example, noise. For this reason, there may be a case where the timing at which the rotation angle θ reaches the second angle θc becomes different from the timing at which the first pulse signal Pa is generated. Accordingly, it is not possible to determine which one of the timing when the rotation angle θ reaches the second angle θc and the generation timing of the first pulse signal Pa is earlier than the other. For the above reasons, the second signal generator 35 determines whether the rotation angle θ, which corresponds to the first pulse signal Pa that is received for the first time after the generation of the latest second pulse signal Pb, is less than the fourth angle θd (step ST6).

When it is determined that the rotation angle θ corresponding to the initial first pulse signal Pa is less than the fourth angle θd (YES at step ST6), the second signal generator 35 refers to the flag F (Step ST6A). The flag F is used to determine whether first pulse signals Pa have been generated consecutively. If the flag F is True, the first pulse signal Pa is the second or subsequent first pulse signal Pa of the first pulse signals Pa that have been generated consecutively. If the flag F is True (YES at step ST6A), the rotation angle detector 100 calculates a rotation amount (step ST7). This corresponds to each of the cases in the example of FIG. 4 where the first pulse signals Pa1' and Pa3' are generated at times t2' and t4'. If the flag F is False (NO at step ST6A), the second signal generator 35 sets the flag F to True (step ST6B). Then, the second signal generator 35 resets the rotation angle θ to zero (step ST11). This is because when the rotation angle θ is less than the fourth angle θd, the actual rotation angle at the time when the first pulse signal Pa is generated is close to the second angle θc. That is, when the rotation angle θ is less than the fourth angle θd, it can be determined that the first pulse signal Pa corresponds to the second pulse signal Pb generated immediately before the generation of the first pulse signal Pa. This corresponds to each of the cases in the example of FIG. 4 where the first pulse signals Pa3 and Pa6 are generated at times t4 and t8. That is, it can be determined that the first pulse signals Pa3 and Pa6 correspond to the second pulse signals Pb3 and Pb5.

When it is determined that the rotation angle θ corresponding to the initial first pulse signal Pa is greater than or equal to the fourth angle θd (NO at step ST6), i.e., when it is determined that the rotation angle θ is within the angle range R1, the second signal generator 35 determines that the first pulse signal Pa is based on noise. In this case, the second signal generator 35 neither generates the second pulse signal Pb nor resets the rotation angle θ. Then, the rotation information calculator 36 calculates a rotation amount of the motor 10 based on outputs from the second signal generator 35. This corresponds to a case in the example of FIG. 4 where the first pulse signal Pa5 is generated at time t6. That is, the second signal generator 35 determines that the first pulse signal Pa5 is based on noise.

Then, the rotation angle detector 100 calculates a rotation amount of the motor 10 (step ST7). In the example of FIG. 1, the rotation information calculator 36 of the rotation angle detector 100 calculates the rotation amount after the start of rotation of the motor 10 by multiplying the number of the second pulse signals Pb generated after the start of rotation of the motor 10 by the second angle θc.

Figure 6:
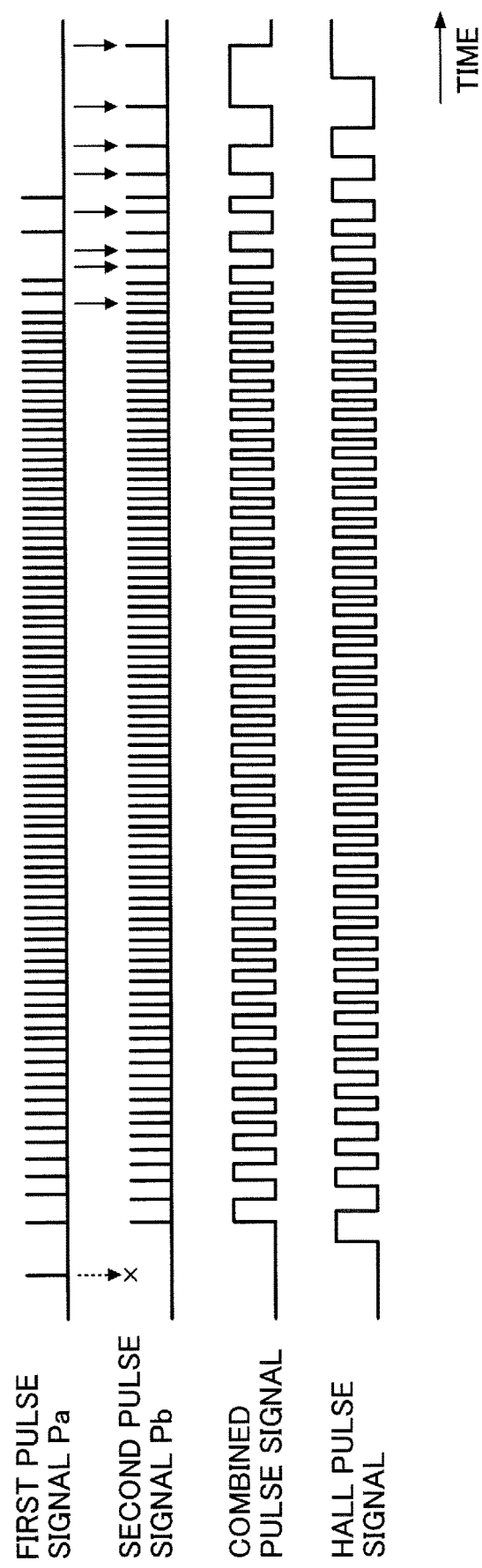
FIG. 6 is a drawing illustrating transitions of a combined pulse signal and a Hall pulse signal.

Next, results of an experiment regarding the reliability of the rotation amounts of the motor 10 calculated by the rotation angle detector 100 are described with reference to FIG. 6. FIG. 6 is a drawing illustrating transitions of a combined pulse signal and a Hall pulse signal.

The combined pulse signal is obtained by combining multiple pulses of the second pulse signals Pb into one pulse. In the example of FIG. 6, the inter-slit angle (the second angle θc) is 90 degrees. The first pulse signal Pa and the second pulse signal Pb are basically generated each time the rotation shaft of the motor 10 rotates 90 degrees. The combined pulse signal is obtained by combining two pulses of the second pulse signals Pb into one pulse. That is, the rotation angle detector 100 is configured to generate one combined pulse signal each time the rotation shaft of the motor 10 rotates 180 degrees.

The Hall pulse signal is a pulse signal output by a Hall sensor. The Hall sensor detects a magnetic flux generated by a magnet attached to the rotation shaft of the motor 10 for comparison between the second pulse signal Pb and the Hall pulse signal. In the example of FIG. 6, the rotation angle detector 100 is configured to generate one Hall pulse signal each time the rotation shaft of the motor 10 rotates 180 degrees.

In FIG. 6, a dotted arrow leading to "X" indicates that the second pulse signal Pb was not generated based on the first pulse signal Pa. That is, the dotted arrow indicates that the first pulse signal Pa was ignored as noise. Also, each of eight solid arrows in FIG. 6 indicates that the second pulse signal Pb was added when the generation of the first pulse signal Pa failed.

In the example of FIG. 6, it has been confirmed that the number of combined pulse signals generated during a period after the forward rotation of the motor 10 is started and before the forward rotation is stopped is the same as the number of Hall pulse signals generated during the period. That is, it has been confirmed that the rotation amount of the motor 10 calculated based on the second pulse signals Pb is the same as the rotation amount of the motor 10 detected by the Hall sensor.

Figure 7:
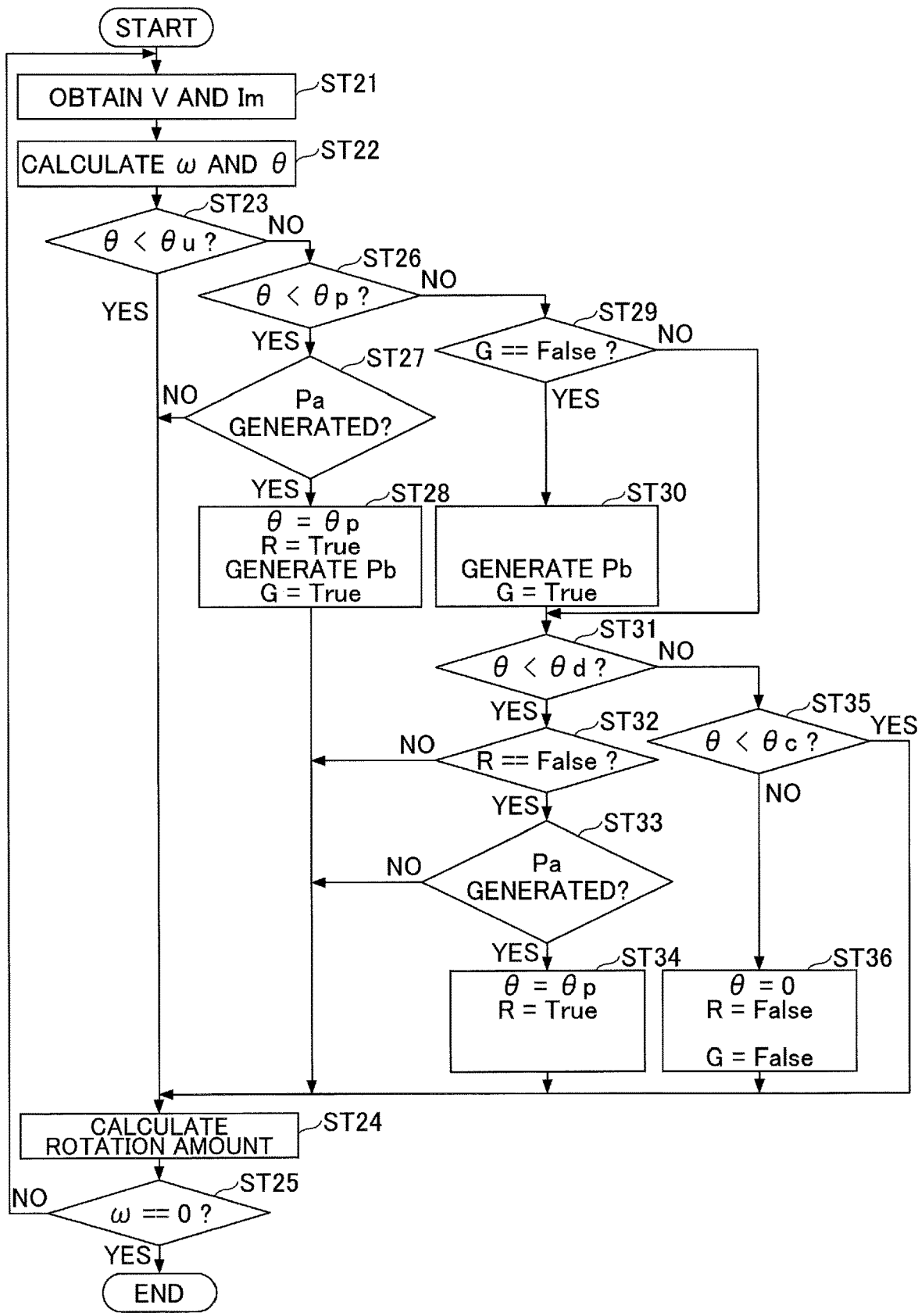
FIG. 7 is a flowchart illustrating another example of a rotation-amount calculation process.
Figure 8:
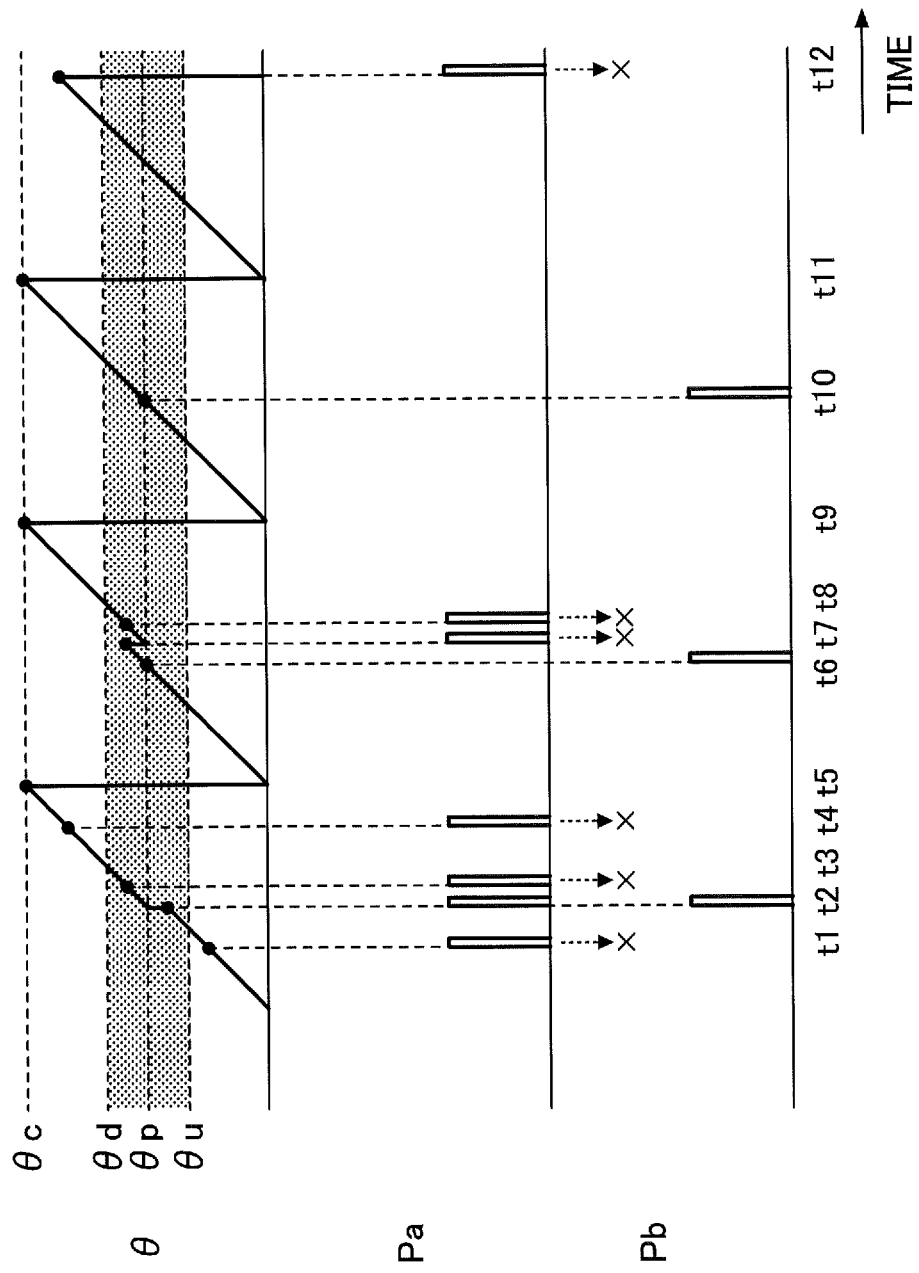
FIG. 8 is a timing chart illustrating another example of timings at which second pulse signals are generated.

Next, another example of a rotation-amount calculation process is described with reference to FIGS. 7 and 8. FIG. 7 is a flowchart illustrating another example of a rotation-amount calculation process. The rotation angle detector 100 performs the rotation-amount calculation process while the motor 10 is being driven. FIG. 8 is a timing chart illustrating an example of timings at which the second signal generator 35 generates second pulse signals Pb by performing the rotation-amount calculation process illustrated in FIG. 7. In FIG. 8, an acceptable range where the rotation angle θ is greater than or equal to the third angle θu and less than the fourth angle θd is indicated by a dot pattern.

In the example of FIGS. 7 and 8, the first angle θp is greater than or equal to the third angle θu and less than or equal to the fourth angle θd. The second angle θc is the same as the inter-slit angle of the motor 10. The third angle θu and the fourth angle θd are thresholds for determining whether the first pulse signal Pa is acceptable. The third angle θu is less than the fourth angle θd.

In summary, the second signal generator 35 of the rotation angle detector 100 generates the second pulse signal Pb based on the initial first pulse signal Pa generated for the first time by the first signal generator 34 while the rotation angle θ is within the acceptable range where the rotation angle θu is greater than or equal to the third angle θu and less than the fourth angle θd. However, the second signal generator 35 ignores the second and subsequent first pulse signals Pa that are generated by the first signal generator 34 while the rotation angle θ is greater than or equal to the third angle θu and less than the fourth angle θd. Also, the second signal generator 35 ignores the first pulse signals Pa generated by the first signal generator 34 when the rotation angle θ is less than the third angle θu or greater than or equal to the fourth angle θd.

Also, if the first signal generator 34 has not generated the first pulse signal Pa while the rotation angle θ increases from the third angle θu to the first angle θp, the second signal generator 35 generates the second pulse signal Pb when the rotation angle θ becomes the first angle θp. This is because it can be assumed that the actual rotation angle of the motor 10 from the previous generation of the second pulse signal Pb has increased by an angle corresponding to one period of the ripple component Ir. Also, this is because the first pulse signal Pa is basically generated each time the actual rotation angle of the motor 10 increases by an angle corresponding to one period of the ripple component Ir. In this case, the second signal generator 35 ignores the first pulse signal Pa generated by the first signal generator 34 thereafter.

In the example of FIG. 7, the rotation angle detector 100 first obtains the inter-terminal voltage V and the current Im (Step ST21). Specifically, the rotation angle detector 100 obtains the inter-terminal voltage V output from the voltage detector 10a and the current Im output from the current detector 10b at each predetermined control period.

Next, the rotation angle detector 100 calculates the rotational angular velocity ω and the rotation angle θ (step ST22). In the example of FIG. 7, the rotational angular velocity calculator 31 of the rotation angle detector 100 calculates the rotational angular velocity ω at each predetermined control period by inserting the inter-terminal voltage V' and the current Im in formula (1). Then, the rotation angle calculator 32 of the rotation angle detector 100 calculates the rotation angle θ by integrating rotational angular velocities ω calculated at the respective control periods.

Next, the rotation angle detector 100 determines whether the rotation angle θ is less than the third angle θu (step ST23). In the example of FIG. 7, the second signal generator 35 of the rotation angle detector 100 determines whether the rotation angle θ is less than the third angle θu.

When it is determined that the rotation angle θ is less than the third angle θu (YES at step ST23), the rotation angle detector 100 calculates a rotation amount (step ST24). In the example of FIG. 7, the rotation information calculator 36 of the rotation angle detector 100 calculates the rotation amount of the motor 10 based on outputs from the second signal generator 35.

Next, the rotation angle detector 100 determines whether the rotational angular velocity ω has become zero (step ST25). When it is determined that the rotational angular velocity ω is not zero (NO at step ST25), the rotation angle detector 100 returns to step ST21. When it is determined that the rotational angular velocity ω has become zero (YES at step ST25), the rotation angle detector 100 ends the rotation-amount calculation process.

When it is determined that the rotation angle θ is not less than the third angle θu (NO at step ST23), the rotation angle detector 100 determines whether the rotation angle θ is less than the first angle θp (step ST26). When it is determined that the rotation angle θ is less than the first angle θp (YES at step ST26), the rotation angle detector 100 determines whether the first pulse signal Pa has been generated (step ST27).

When it is determined that the first pulse signal Pa has not been generated (NO at step ST27), the rotation angle detector 100 calculates a rotation amount (step ST24). Then, the rotation information calculator 36 calculates a rotation amount of the motor 10 based on outputs from the second signal generator 35.

When it is determined that the first pulse signal Pa has been generated (YES at step ST27), the rotation angle detector 100 corrects the rotation angle θ to the first angle θp, sets a flag R to True, generates the second pulse signal Pb, and sets a flag G to True (step ST28). Then, the rotation angle detector 100 executes steps ST24 and ST25.

In the example of FIG. 7, the second signal generator 35 outputs a synchronization command to the rotation angle calculator 32. Upon receiving the synchronization command, the rotation angle calculator 32 corrects the rotation angle θ to the first angle θp.

The flag R indicates whether the first pulse signal Pa has been generated. The initial value of the flag R is False indicating that the first pulse signal Pa has not been generated. If the flag R is set to True, it indicates that the first pulse signal Pa has already been generated.

The flag G indicates whether the second pulse signal Pb has been generated. The initial value of the flag G is False indicating that the second pulse signal Pb has not been generated. If the flag G is set to True, it indicates that the second pulse signal Pb has already been generated.

When it is determined that the rotation angle θ is greater than or equal to the first angle θp (NO at step ST26), the rotation angle detector 100 determines whether the flag G is False (Step ST29). That is, the rotation angle detector 100 determines whether the second signal generator 35 has already generated the second pulse signal Pb before the rotation angle θ reaches the first angle θp.

When it is determined that the flag G is False (YES at step ST29), i.e., when the second signal generator 35 has not generated the second pulse signal Pb before the rotation angle θ becomes the first angle θp, the rotation angle detector 100 generates the second pulse signal Pb and sets the flag G to True (Step ST30).

Next, the rotation angle detector 100 determines whether the rotation angle θ is less than the fourth angle θd (step ST31). When it is determined that the flag G is not False (NO at step ST29), i.e., when the second signal generator 35 has generated the second pulse signal Pb before the rotation angle θ becomes the first angle θp, the rotation angle detector 100 executes step ST31 without executing step ST30.

When it is determined that the rotation angle θ is less than the fourth angle θd (YES at step ST31), the rotation angle detector 100 determines whether the flag R is False (step ST32). That is, the rotation angle detector 100 determines whether the first signal generator 34 has already generated the first pulse signal Pa during a period where the rotation angle θ increases from the third angle θu to the current rotation angle.

When it is determined that the flag R is False (YES at step ST32), i.e., when the first signal generator 34 has not generated the first pulse signal Pa during a period where the rotation angle θ increases from the third angle θu to the current rotation angle, the rotation angle detector 100 determines whether the first pulse signal Pa has been generated (step ST33).

When it is determined that the flag R is not False (NO at step ST32), i.e., when the first signal generator 34 has already generated the first pulse signal Pa during a period where the rotation angle θ increases from the third angle θu to the current rotation angle, the rotation angle detector 100 executes steps ST24 and ST25 without executing step ST33.

When it is determined at step ST33 that the first pulse signal Pa has been generated (YES at step ST33), the rotation angle detector 100 corrects the rotation angle θ to the first angle θp and sets the flag R to True (step ST34). Then, the rotation angle detector 100 executes steps ST24 and ST25.

When it is determined that the first pulse signal Pa has not been generated (NO at step ST33), the rotation angle detector 100 executes steps ST24 and ST25 without executing step ST34.

When it is determined at step ST31 that the rotation angle θ is not less than the fourth angle θd (NO at step ST31), the rotation angle detector 100 determines whether the rotation angle θ is less than the second angle θc (step ST35).

When it is determined that the rotation angle θ is not less than the second angle θc (NO at step ST35), i.e., when the rotation angle θ has reached an angle corresponding to one period of the ripple component Ir, the rotation angle detector 100 resets the rotation angle θ to zero, sets the flag R to False, and sets the flag G to False (step ST36). Then, the rotation angle detector 100 executes steps ST24 and ST25.

When it is determined that the rotation angle θ is less than the second angle θc (YES at step ST35), the rotation angle detector 100 executes steps ST24 and ST25 without executing step ST36.

In the example of FIG. 8, the rotation angle θ is less than the third angle θu at time t1 when the first signal generator 34 generates the first pulse signal Pa. For this reason, the second signal generator 35 ignores the first pulse signal Pa generated by the first signal generator 34 at time t1 according to a process flow in FIG. 7 that proceeds from step ST23 to step ST24. That is, the second signal generator 35 does not generate the second pulse signal Pb.

The rotation angle θ at time t2 when the first signal generator 34 generates the first pulse signal Pa is greater than or equal to the third angle θu and less than the first angle θp. Also, the first pulse signal Pa generated by the first signal generator 34 at time t2 is the initial first pulse signal Pa generated for the first time during a period where the rotation angle θ increases from the third angle θu to the first angle θp. Therefore, the second signal generator 35 corrects the rotation angle θ to the first angle θp, sets the flag R to True, generates the second pulse signal Pb, and sets the flag G to True according to a process flow in FIG. 7 that starts from step ST26, goes through steps ST27 and ST28, and leads to step ST24.

The rotation angle θ at time t3 when the first signal generator 34 generates the first pulse signal Pa is greater than or equal to the first angle θp and less than the fourth angle θd. Therefore, the second signal generator 35 ignores the first pulse signal Pa generated by the first signal generator 34 at time t3 according to a process flow in FIG. 7 that starts from step ST31, goes through step ST32, and leads to step ST24.

The rotation angle θ at time t4 when the first signal generator 34 generates the first pulse signal Pa is greater than or equal to the fourth angle θd and less than the second angle θc. Therefore, the second signal generator 35 ignores the first pulse signal Pa generated by the first signal generator 34 at time t4 according to a process flow in FIG. 7 that proceeds from step ST35 to step ST24. The same applies to time t12.

At time t5, the rotation angle θ reaches the second angle θc. Therefore, the second signal generator 35 resets the rotation angle θ to zero, sets the flag R to False, and sets the flag G to False according to a process flow in FIG. 7 that starts from step ST35, goes through step ST36, and leads to step ST24. The same applies to time t9 and time t11.

At time t6, the rotation angle θ reaches the first angle θp. Also, the first signal generator 34 has not generated the first pulse signal Pa during a period where the rotation angle θ increases from the third angle θu to the first angle θp. Therefore, the second signal generator 35 generates the second pulse signal Pb according to a process flow in FIG. 7 that starts from step ST26, goes through step ST29, and leads to step ST30. The same applies to time t10.

The rotation angle θ at time t7 when the first signal generator 34 generates the first pulse signal Pa is greater than or equal to the first angle θp and less than the fourth angle θd. Also, the first pulse signal Pa generated by the first signal generator 34 at time t7 is the initial first pulse signal Pa generated for the first time during a period where the rotation angle θ increases from the third angle θu to the fourth angle θd. Therefore, the second signal generator 35 corrects the rotation angle θ to the first angle θp and sets the flag R to True according to a process flow in FIG. 7 that starts from step ST31, goes through steps ST32, ST33, and ST34, and leads to step ST24. In this case, the second signal generator 35 does not generate the second pulse signal Pb and does not set the flag G to True. This is because the second pulse signal Pb has already been generated at time t6.

The rotation angle θ at time t8 when the first signal generator 34 generates the first pulse signal Pa is greater than or equal to the first angle θp and less than the fourth angle θd. Also, the first pulse signal Pa generated by the first signal generator 34 at time t8 is not the initial first pulse signal Pa but the second first pulse signal Pa generated during the period where the rotation angle θ increases from the third angle θu to the fourth angle θd. Therefore, the second signal generator 35 ignores the first pulse signal Pa generated by the first signal generator 34 at time t8 according to a process flow in FIG. 7 that starts from step ST32, skips steps ST33 and ST34, and leads to step ST24.

Similarly to the rotation-amount calculation process illustrated in FIG. 5, the rotation-amount calculation process illustrated in FIG. 7 enables the rotation angle detector 100 to keep the detection error in the rotation angle θ within a practically acceptable range.

Figure 9:
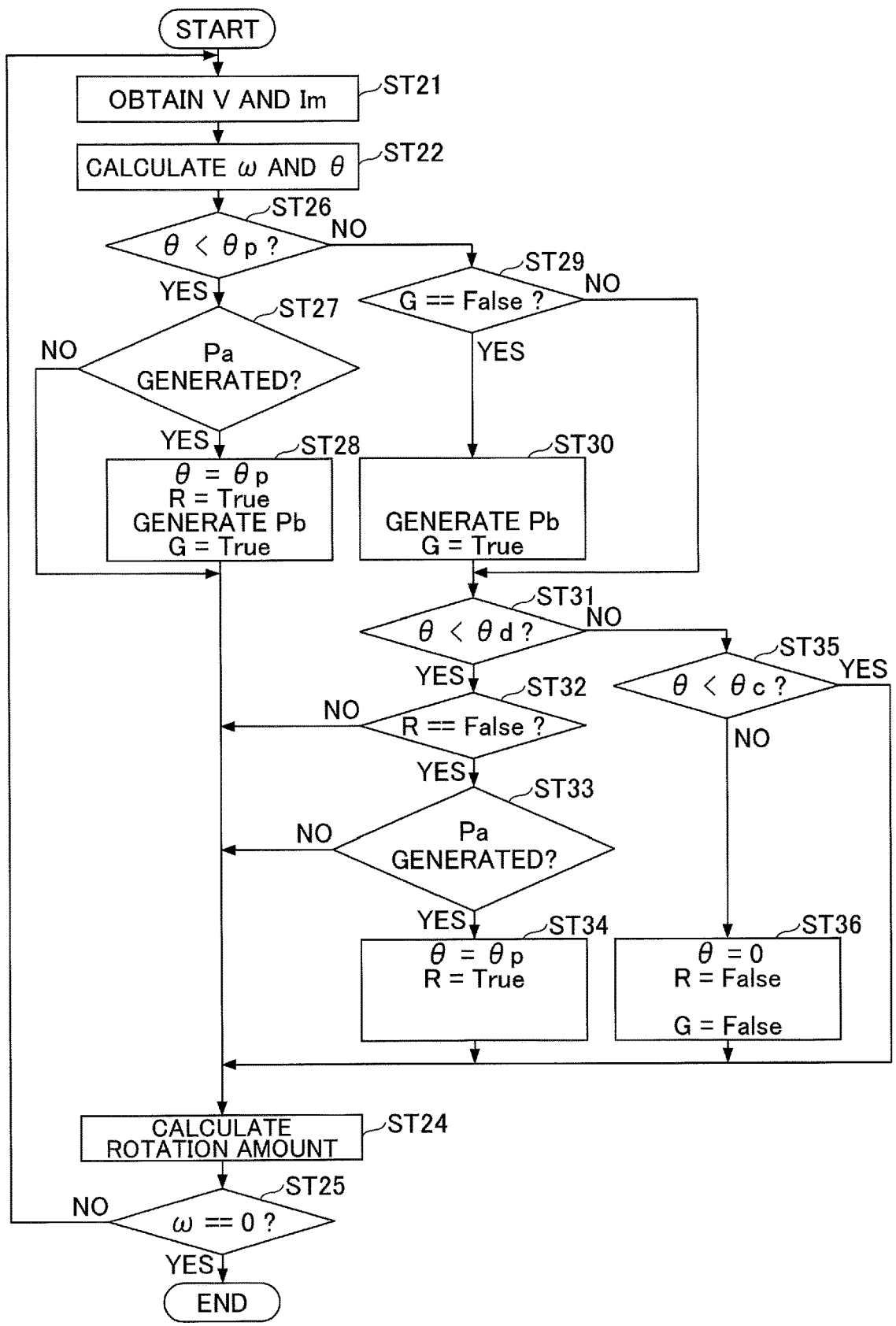
FIG. 9 is a flowchart illustrating another example of a rotation-amount calculation process.
Figure 10:
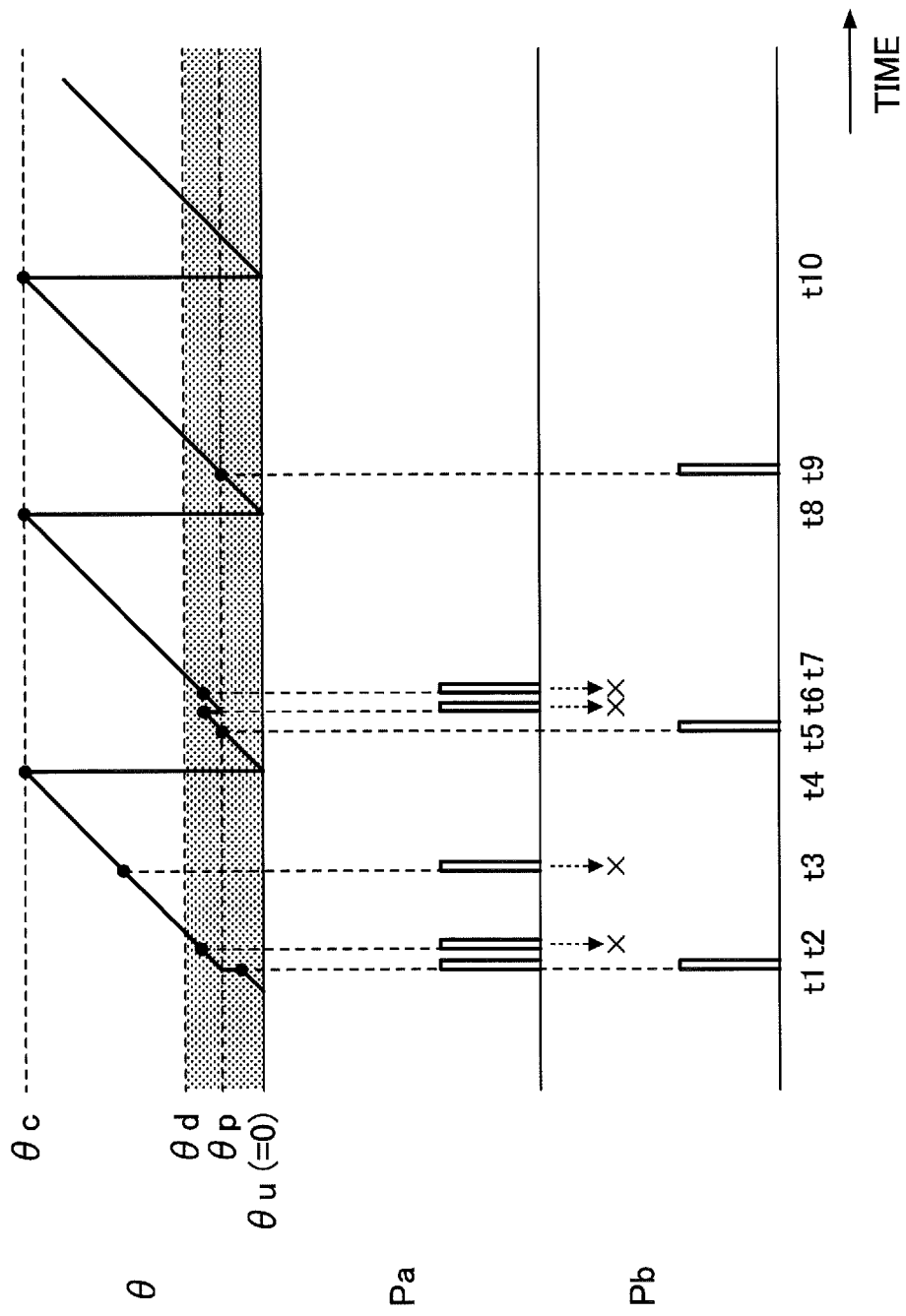
FIG. 10 is a timing chart illustrating another example of timings at which second pulse signals are generated.

Next, another example of a rotation-amount calculation process is described with reference to FIGS. 9 and 10. FIG. 9 is a flowchart illustrating still another example of a rotation-amount calculation process. The rotation angle detector 100 performs the rotation-amount calculation process while the motor 10 is being driven. FIG. 9 is a variation of the flowchart of FIG. 7. Therefore, the same reference number (step number) is assigned to the corresponding steps in these flowcharts. The same applies to FIGS. 9, 11, 13, 15, 18, and 20 described later. FIG. 10 is a timing chart illustrating an example of timings at which the second signal generator 35 generates second pulse signals Pb by performing the rotation-amount calculation process illustrated in FIG. 9. In FIG. 10, an acceptable range where the rotation angle θ is greater than or equal to the third angle θu (zero) and less than the fourth angle θd is indicated by a dot pattern.

The examples of FIGS. 9 and 10 are substantially the same as the examples of FIGS. 7 and 8 except that the third angle θu is set at zero. Specifically, in FIG. 9, because the third angle θu is set at zero, step ST23 (see FIG. 7) for determining whether the rotation angle θ is less than the third angle θu is omitted. Also, in FIG. 10, the acceptable range indicated by a dot pattern is positioned lower than the acceptable range in FIG. 8.

More specifically, in FIG. 10, the rotation angle θ at time t1 when the first signal generator 34 generates the first pulse signal Pa is greater than or equal to the third angle θu or zero and is less than the first angle θp. Also, the first pulse signal Pa generated by the first signal generator 34 at time t1 is the initial first pulse signal Pa generated for the first time during a period where the rotation angle θ increases from the third angle θu (zero) to the first angle θp. Therefore, the second signal generator 35 corrects the rotation angle θ to the first angle θp, sets the flag R to True, generates the second pulse signal Pb, and sets the flag G to True according to a process flow in FIG. 9 that starts from step ST26, goes through steps ST27 and ST28, and leads to step ST24.

Similarly to the rotation-amount calculation processes described above, the rotation-amount calculation process illustrated in FIG. 9 enables the rotation angle detector 100 to keep the detection error in the rotation angle θ within a practically acceptable range.

Figure 11:
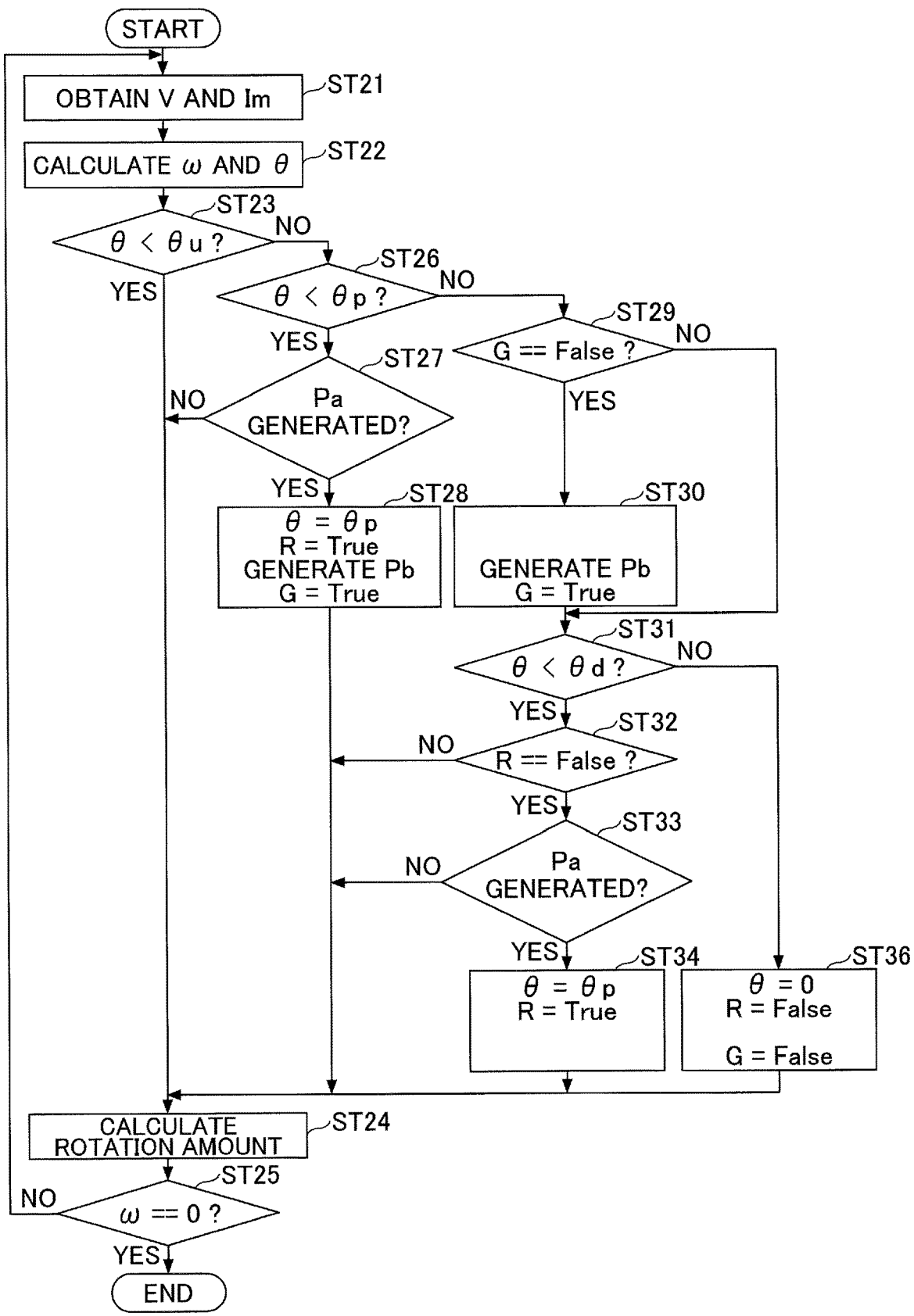
FIG. 11 is a flowchart illustrating another example of a rotation-amount calculation process.
Figure 12:
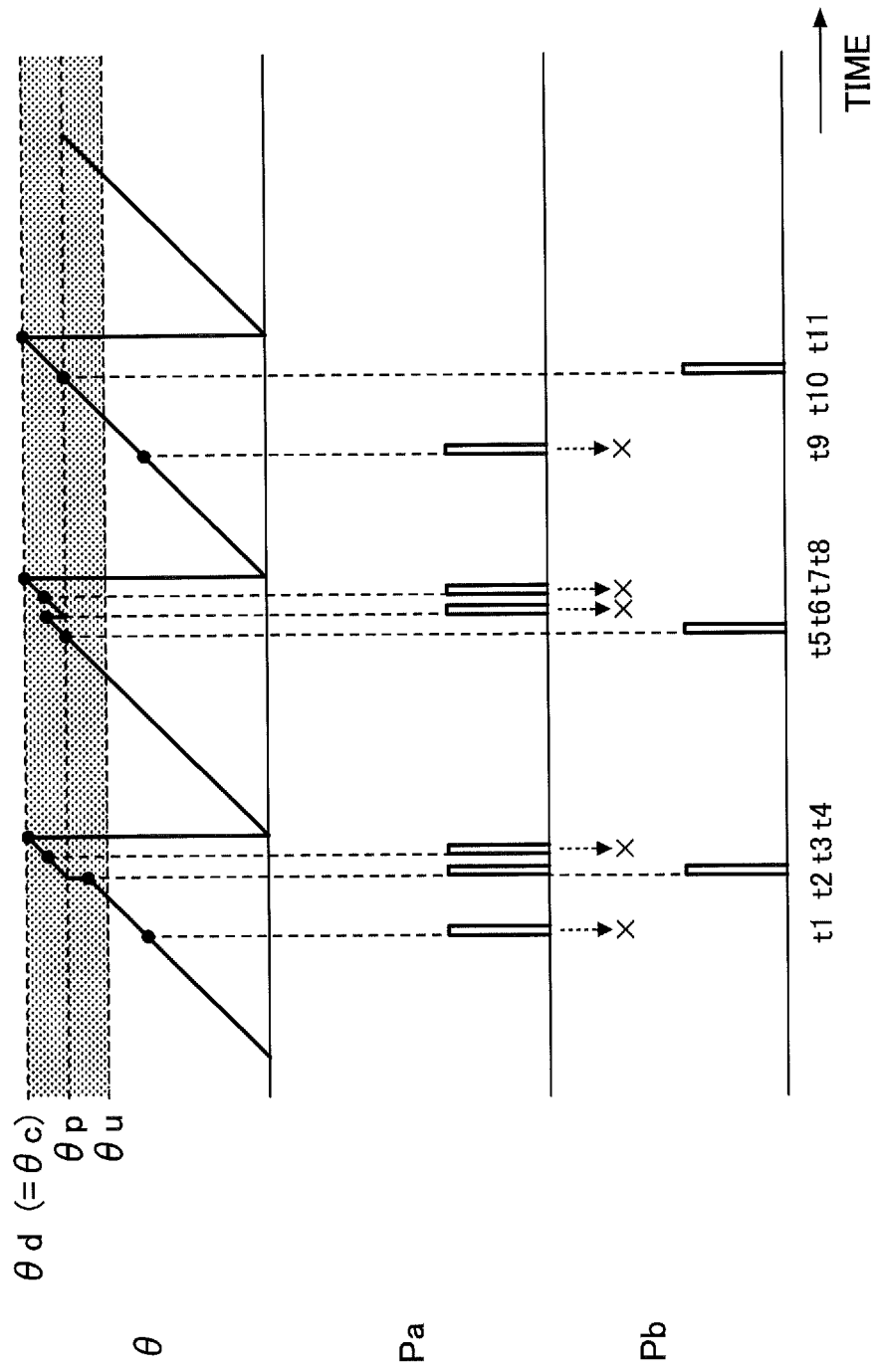
FIG. 12 is a timing chart illustrating another example of timings at which second pulse signals are generated.

Next, still another example of a rotation-amount calculation process is described with reference to FIGS. 11 and 12. FIG. 11 is a flowchart illustrating still another example of a rotation-amount calculation process. The rotation angle detector 100 performs the rotation-amount calculation process while the motor 10 is being driven. FIG. 12 is a timing chart illustrating an example of timings at which the second signal generator 35 generates second pulse signals Pb by performing the rotation-amount calculation process illustrated in FIG. 11. In FIG. 12, an acceptable range where the rotation angle θ is greater than or equal to the third angle θu and less than the fourth angle θd (=the second angle θc) is indicated by a dot pattern.

The examples of FIGS. 11 and 12 are substantially the same as the examples of FIGS. 7 and 8 except that the fourth angle θd is set at the second angle θc. Specifically, in FIG. 11, because the fourth angle θd is set at the second angle θc, step ST35 (see FIG. 7) for determining whether the rotation angle θ is less than the second angle θc is omitted. Also, in FIG. 12, the acceptable range indicated by a dot pattern is positioned higher than the acceptable range in FIG. 8.

More specifically, in FIG. 12, the rotation angle θ reaches the fourth angle θd at time t4. Therefore, the second signal generator 35 resets the rotation angle θ to zero, sets the flag R to False, and sets the flag G to False according to a process flow in FIG. 11 that proceeds from step ST31 to step ST36. The same applies to time t8 and time t11.

Similarly to the rotation-amount calculation processes described above, the rotation-amount calculation process illustrated in FIG. 11 enables the rotation angle detector 100 to keep the detection error in the rotation angle θ within a practically acceptable range.

Figure 13:
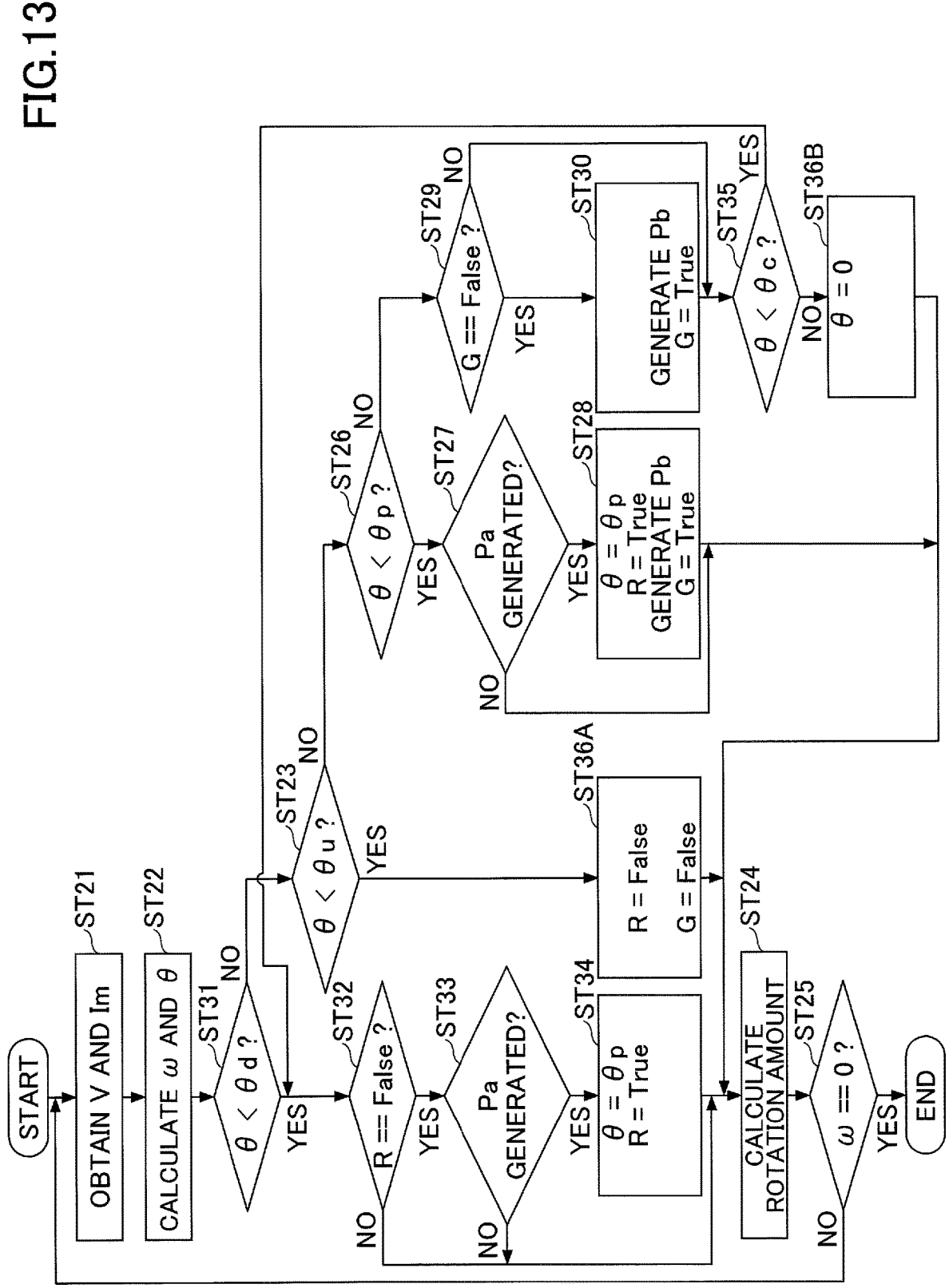
FIG. 13 is a flowchart illustrating another example of a rotation-amount calculation process.
Figure 14:
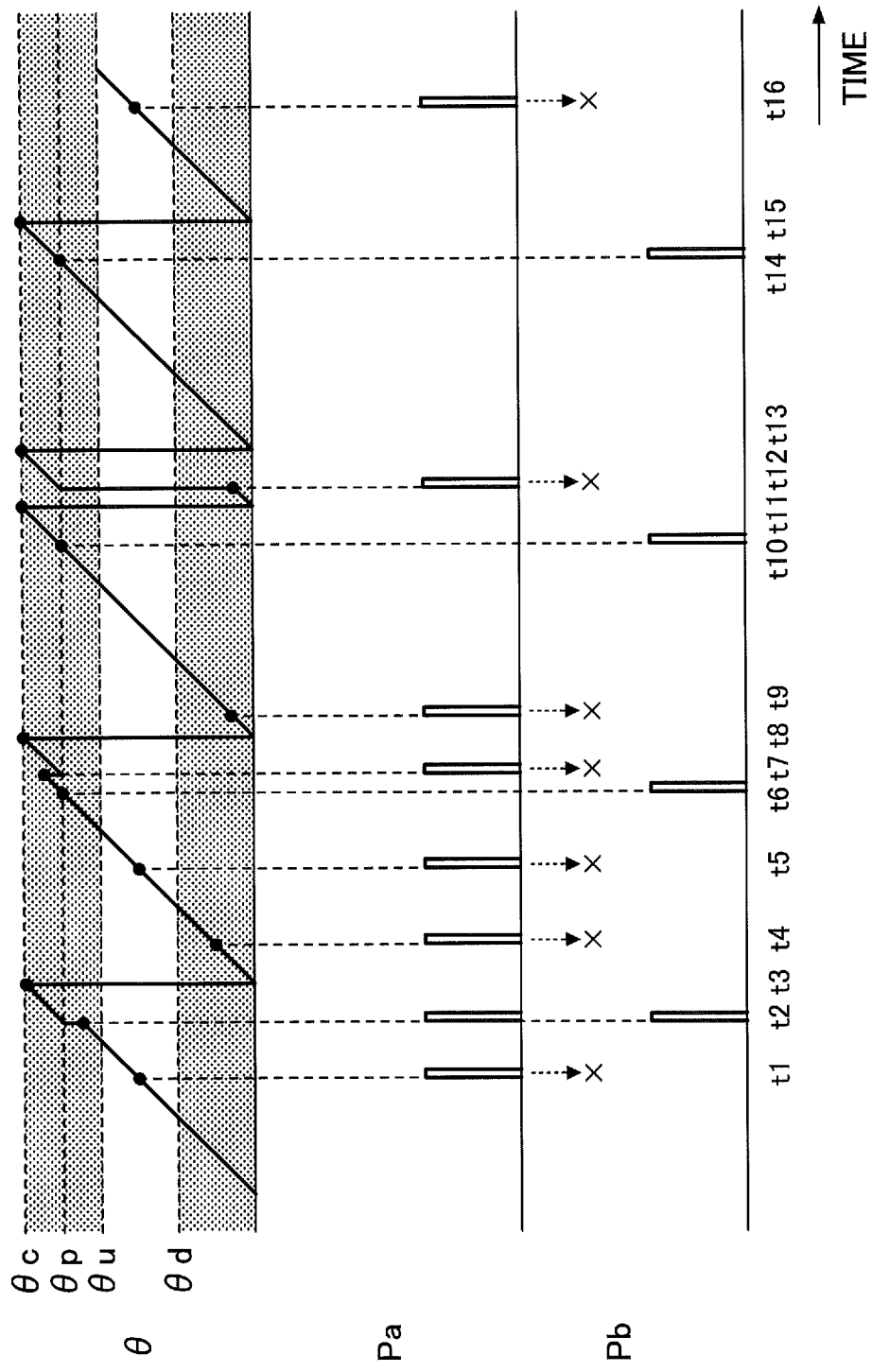
FIG. 14 is a timing chart illustrating another example of timings at which second pulse signals are generated.

Next, still another example of a rotation-amount calculation process is described with reference to FIGS. 13 and 14. FIG. 13 is a flowchart illustrating still another example of a rotation-amount calculation process. The rotation angle detector 100 performs the rotation-amount calculation process while the motor 10 is being driven. FIG. 14 is a timing chart illustrating an example of timings at which the second signal generator 35 generates second pulse signals Pb by performing the rotation-amount calculation process illustrated in FIG. 13. In FIG. 14, an acceptable range indicated by a dot pattern is a combination of an angle range where the rotation angle θ is greater than or equal to the third angle θu and less than the second angle θc and an angle range where the rotation angle θ is greater than or equal to zero and less than the fourth angle θd.

The examples of FIGS. 13 and 14 are substantially the same as the examples of FIGS. 7 and 8 except that the fourth angle θd is less than the third angle θu. Specifically, in the example of FIG. 13, because the fourth angle θd is less than the third angle θu, step ST31 of determining whether the rotation angle θ is less than the fourth angle θd is performed before step ST23 of determining whether the rotation angle θ is less than the third angle θu. When it is determined that the rotation angle θ is greater than or equal to the fourth angle θd and less than the third angle θu (YES at step ST23), the rotation angle detector 100 is configured to perform step ST36A of setting the flags R and G to False. When it is determined at step ST35 that the rotation angle θ is greater than or equal to the second angle θc (NO at step ST35), the rotation angle detector 100 resets the rotation angle θ to zero without setting the flags R and G to False (step ST36B). Processes performed at steps ST36A and ST36B correspond to the processes performed at step ST36 of FIG. 7. When it is determined that the rotation angle θ is less than the second angle θc (YES at step ST35), the rotation angle detector 100 is configured to execute step ST32. Also, in FIG. 14, different from the acceptable range illustrated in FIG. 8, the acceptable range indicated by the dot pattern is separated into two ranges.

More specifically, in the example of FIG. 14, the rotation angle θ at time t1 when the first signal generator 34 generates the first pulse signal Pa is greater than or equal to the fourth angle θd and less than the third angle θu. Therefore, the second signal generator 35 ignores the first pulse signal Pa generated by the first signal generator 34 at time t1 according to a process flow in FIG. 13 that starts from step ST23, goes through step ST36A, and leads to step ST24. That is, the second signal generator 35 does not generate the second pulse signal Pb. The same applies to time t8 and time t16.

The rotation angle θ at time t4 when the first signal generator 34 generates the first pulse signal Pa is less than the fourth angle θd. The first pulse signal Pa generated by the first signal generator 34 at time t4 is not the initial first pulse signal Pa but the second first pulse signal Pa that is generated during a period where the rotation angle θ increases from the third angle θu to the second angle θc, is reset to zero, and increases to the fourth angle θd. Therefore, the second signal generator 35 ignores the first pulse signal Pa generated by the first signal generator 34 at time t4 according to a process flow in FIG. 13 that starts from step ST32, skips steps ST33 and ST34, and leads to step ST24. The same applies to time t9.

The rotation angle θ at time t12 when the first signal generator 34 generates the first pulse signal Pa is less than the fourth angle θd. The first pulse signal Pa generated by the first signal generator 34 at time t12 is the initial first pulse signal Pa that is generated for the first time during a period where the rotation angle θ increases from the third angle θu to the second angle θc, is reset to zero, and increases to the fourth angle θd. Therefore, the second signal generator 35 corrects the rotation angle θ to the first angle θp and sets the flag R to True according to a process flow in FIG. 13 that starts from step ST33, goes through step ST34, and leads to step ST24.

Similarly to the rotation-amount calculation processes described above, the rotation-amount calculation process illustrated in FIG. 13 enables the rotation angle detector 100 to keep the detection error in the rotation angle θ within a practically acceptable range.

Figure 15:
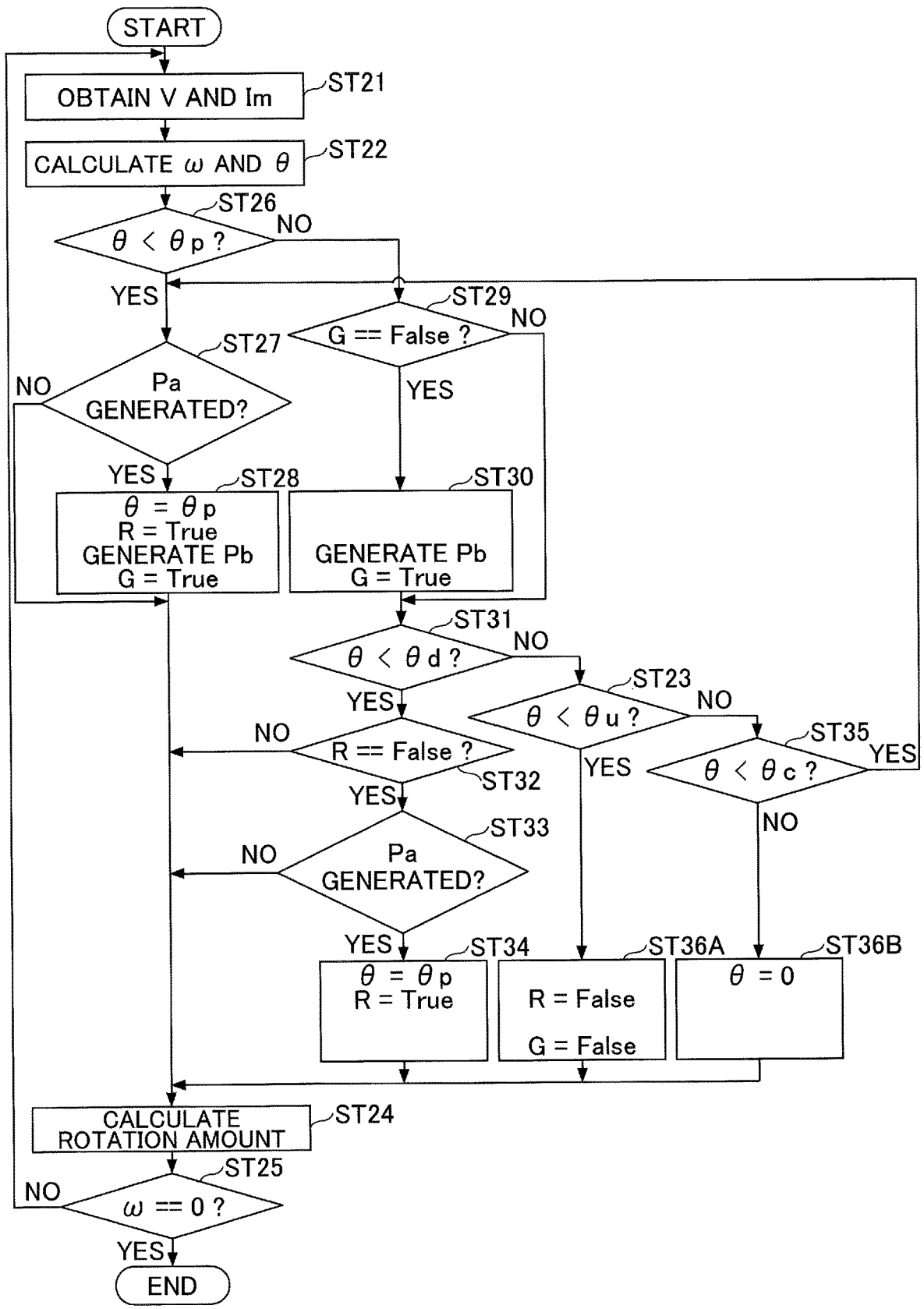
FIG. 15 is a flowchart illustrating another example of a rotation-amount calculation process.
Figure 16:
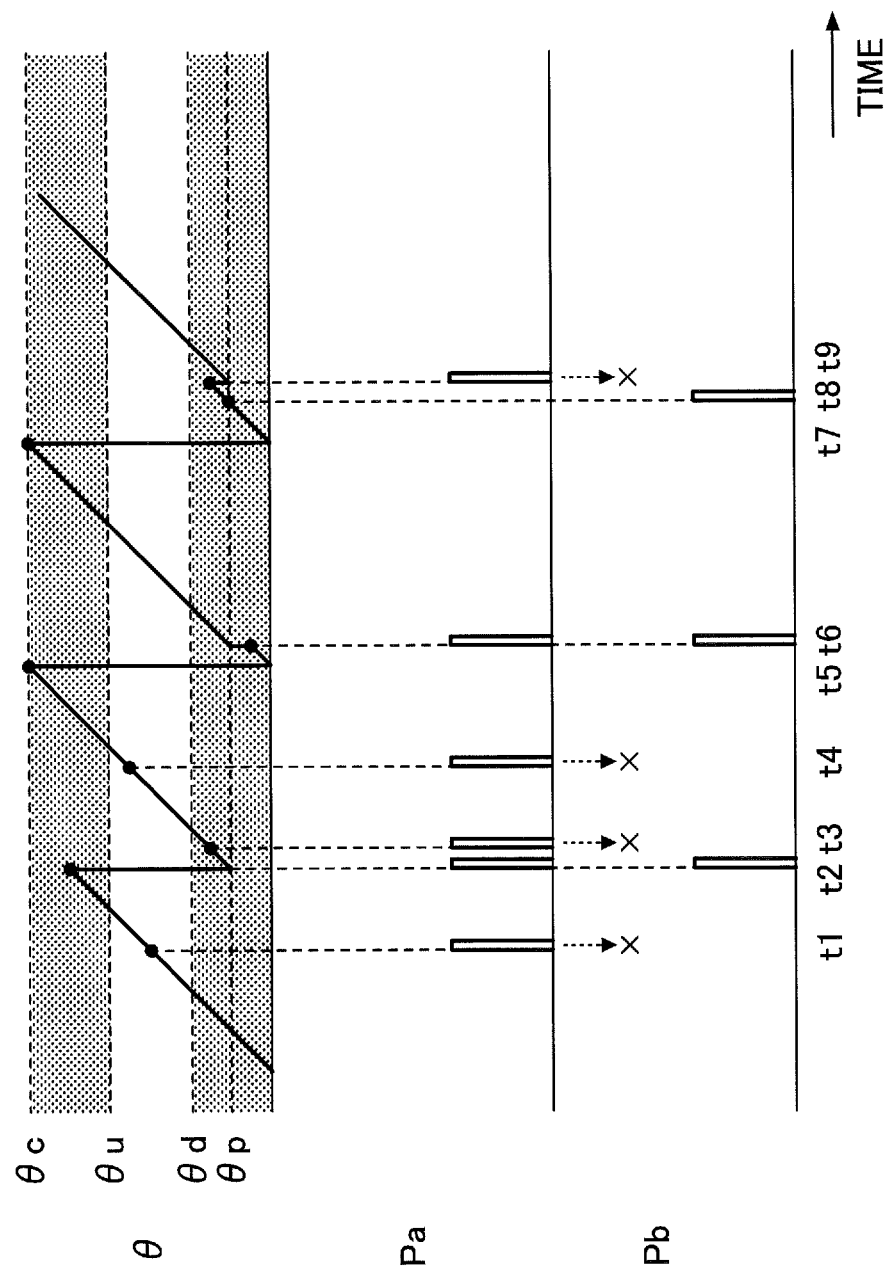
FIG. 16 is a timing chart illustrating another example of timings at which second pulse signals are generated.

Next, still another example of a rotation-amount calculation process is described with reference to FIGS. 15 and 16. FIG. 15 is a flowchart illustrating still another example of a rotation-amount calculation process. The rotation angle detector 100 performs the rotation-amount calculation process while the motor 10 is being driven. FIG. 16 is a timing chart illustrating an example of timings at which the second signal generator 35 generates second pulse signals Pb by performing the rotation-amount calculation process illustrated in FIG. 15. In FIG. 16, an acceptable range indicated by a dot pattern is a combination of an angle range where the rotation angle θ is greater than or equal to the third angle θu and less than the second angle θc and an angle range where the rotation angle θ is greater than or equal to zero and less than the fourth angle θd.

The examples of FIGS. 15 and 16 are substantially the same as the examples of FIGS. 7 and 8 except that the first angle θp and the fourth angle θd are less than the third angle θu. Specifically, in the example of FIG. 15, because the first angle θp and the fourth angle θd are less than the third angle θu, step ST23 of determining whether the rotation angle θ is less than the third angle θu is performed after step ST31 of determining whether the rotation angle θ is less than the fourth angle θd. When it is determined that the rotation angle θ is greater than or equal to the fourth angle θd and less than the third angle θu (YES at step ST23), the rotation angle detector 100 is configured to perform step ST36A for setting the flags R and G to False. When it is determined at step ST35 that the rotation angle θ is greater than or equal to the second angle θc (NO at step ST35), the rotation angle detector 100 resets the rotation angle θ to zero without setting the flags R and G to False (step ST36B). Processes performed at steps ST36A and ST36B correspond to the processes performed at step ST36 of FIG. 7. When it is determined that the rotation angle θ is less than the second angle θc (YES at step ST35), the rotation angle detector 100 is configured to execute step ST27. Also, in FIG. 16, different from the acceptable range illustrated in FIG. 8, the acceptable range indicated by the dot pattern is separated into two ranges.

More specifically, in the example of FIG. 16, the rotation angle θ at time t1 when the first signal generator 34 generates the first pulse signal Pa is greater than or equal to the fourth angle θd and less than the third angle θu. Therefore, the second signal generator 35 ignores the first pulse signal Pa generated by the first signal generator 34 at time t1 according to a process flow in FIG. 15 that starts from step ST23, goes through step ST36A, and leads to step ST24. That is, the second signal generator 35 does not generate the second pulse signal Pb. The same applies to time t4.

The rotation angle θ at time t2 when the first signal generator 34 generates the first pulse signal Pa is greater than or equal to the third angle θu and less than the second angle θc. The first pulse signal Pa generated by the first signal generator 34 at time t2 is the initial first pulse signal Pa generated for the first time during a period where the rotation angle θ increases from the third angle θu to the second angle θc. Therefore, the second signal generator 35 corrects the rotation angle θ to the first angle θp, sets the flag R to True, generates the second pulse signal Pb, and sets the flag G to True according to a process flow in FIG. 15 that starts from step ST35, goes through steps ST27 and ST28, and leads to step ST24.

The rotation angle θ at time t3 when the first signal generator 34 generates the first pulse signal Pa is less than the fourth angle θd. The first pulse signal Pa generated by the first signal generator 34 at time t3 is not the initial first pulse signal Pa but the second first pulse signal Pa that is generated during a period where the rotation angle θ increases from the third angle θu to the second angle θc, is reset to zero, and increases to the fourth angle θd. Therefore, the second signal generator 35 ignores the first pulse signal Pa generated by the first signal generator 34 at time t3 according to a process flow in FIG. 15 that starts from step ST32, skips steps ST33 and ST34, and leads to step ST24.

The rotation angle θ at time t6 when the first signal generator 34 generates the first pulse signal Pa is less than the first angle θp. The first pulse signal Pa generated by the first signal generator 34 at time t6 is the initial first pulse signal Pa that is generated for the first time during a period where the rotation angle θ increases from the third angle θu to the second angle θc, is reset to zero, and increases to the fourth angle θd. Therefore, the second signal generator 35 corrects the rotation angle θ to the first angle θp, sets the flag R to True, generates the second pulse signal Pb, and sets the flag G to True according to a process flow in FIG. 15 that starts from step ST26, goes through steps ST27 and ST28, and leads to step ST24.

The rotation angle θ at time t9 when the first signal generator 34 generates the first pulse signal Pa is greater than or equal to the first angle θp and less than the fourth angle θd. The first pulse signal Pa generated by the first signal generator 34 at time t9 is the initial first pulse signal Pa that is generated for the first time during a period where the rotation angle θ increases from the third angle θu to the second angle θc, is reset to zero, and increases to the fourth angle θd. Therefore, the second signal generator 35 corrects the rotation angle θ to the first angle θp and sets the flag R to True according to a process flow in FIG. 15 that starts from step ST31, goes through steps ST32, ST33, and ST34, and leads to step ST24. In this case, the second signal generator 35 does not generate the second pulse signal Pb and does not set the flag G to True. This is because the second pulse signal Pb has already been generated at time t8.

Similarly to the rotation-amount calculation processes described above, the rotation-amount calculation process illustrated in FIG. 15 enables the rotation angle detector 100 to keep the detection error in the rotation angle θ within a practically acceptable range.

Figure 17:
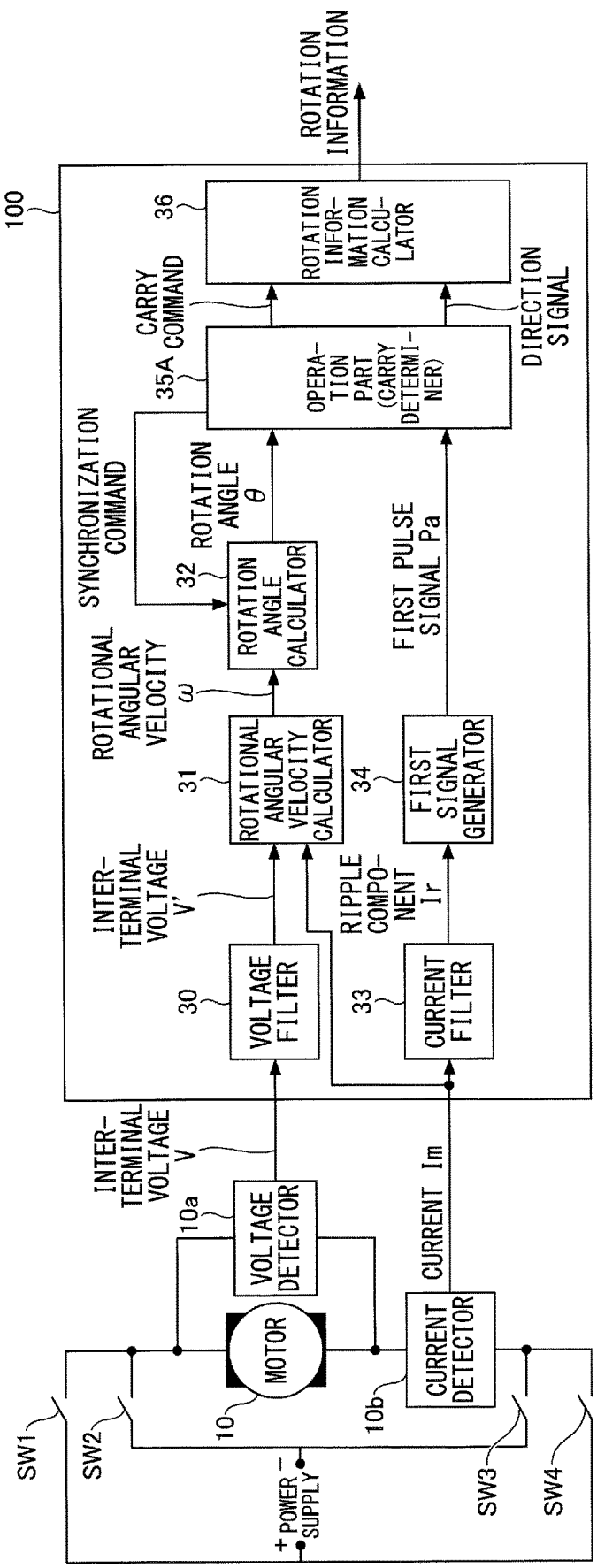
FIG. 17 is a block diagram illustrating another example of a configuration of a rotation angle detector.

Next, another example of a configuration of the rotation angle detector 100 is described with reference to FIG. 17. FIG. 17 is a block diagram illustrating another example of a configuration of the rotation angle detector 100. The rotation angle detector 100 of FIG. 17 is substantially the same as the rotation angle detector 100 of FIG. 1 except that a carry determiner 35A is provided instead of the second signal generator 35. Therefore, descriptions of the common components are omitted, and differences between the configurations of FIG. 1 and FIG. 17 are described in detail.

The carry determiner 35A is another example of an operation part and determines whether the motor 10 has rotated by an inter-slit angle. When it is determined that the motor 10 has rotated by the inter-slit angle, the carry determiner 35A generates a carry command. The carry command is another example of information indicating that the motor 10 has rotated by a predetermined angle, and is a software instruction corresponding to the second pulse signal Pb that is a hardware signal. "Carry" indicates incrementing the number of times the rotation angle θ reached the inter-slit angle.

The rotation information calculator 36 calculates rotation information of the motor 10 based on the carry commands output from the carry determiner 35A. For example, the rotation information calculator 36 calculates the rotation amount after the start of rotation of the motor 10 by multiplying the number of the carry commands received after the start of rotation of the motor 10 by the second angle θc. In this process, the rotation information calculator 36 determines whether to increment or decrement the number of the carry commands based on a direction signal output from the carry determiner 35A together with the carry command. Alternatively, the rotation information calculator 36 may separately count the number of carry commands received together with direction signals indicating the forward rotation direction and the number of carry commands received together with direction signals indicating the backward rotation direction, and calculate the rotation amount of the motor 10 based the difference between the counted numbers. The direction signal may be integrated with the carry command. Also, the carry determiner 35A, which is an operation part, and the rotation information calculator 36 may be integrated with each other.

In the example of FIG. 17, the carry determiner 35A generates the carry command for each inter-slit angle based on the rotation angle signal output from the rotation angle calculator 32 and the first pulse signal Pa output from the first signal generator 34. Because the first pulse signal Pa is estimated based solely on the waveform of the ripple component Ir, the first pulse signal Pa tends to be output erroneously. However, because the carry command is estimated based on both of the first pulse signal Pa and the rotation angle signal, the frequency of errors can be made less than a given value.

Figure 18:
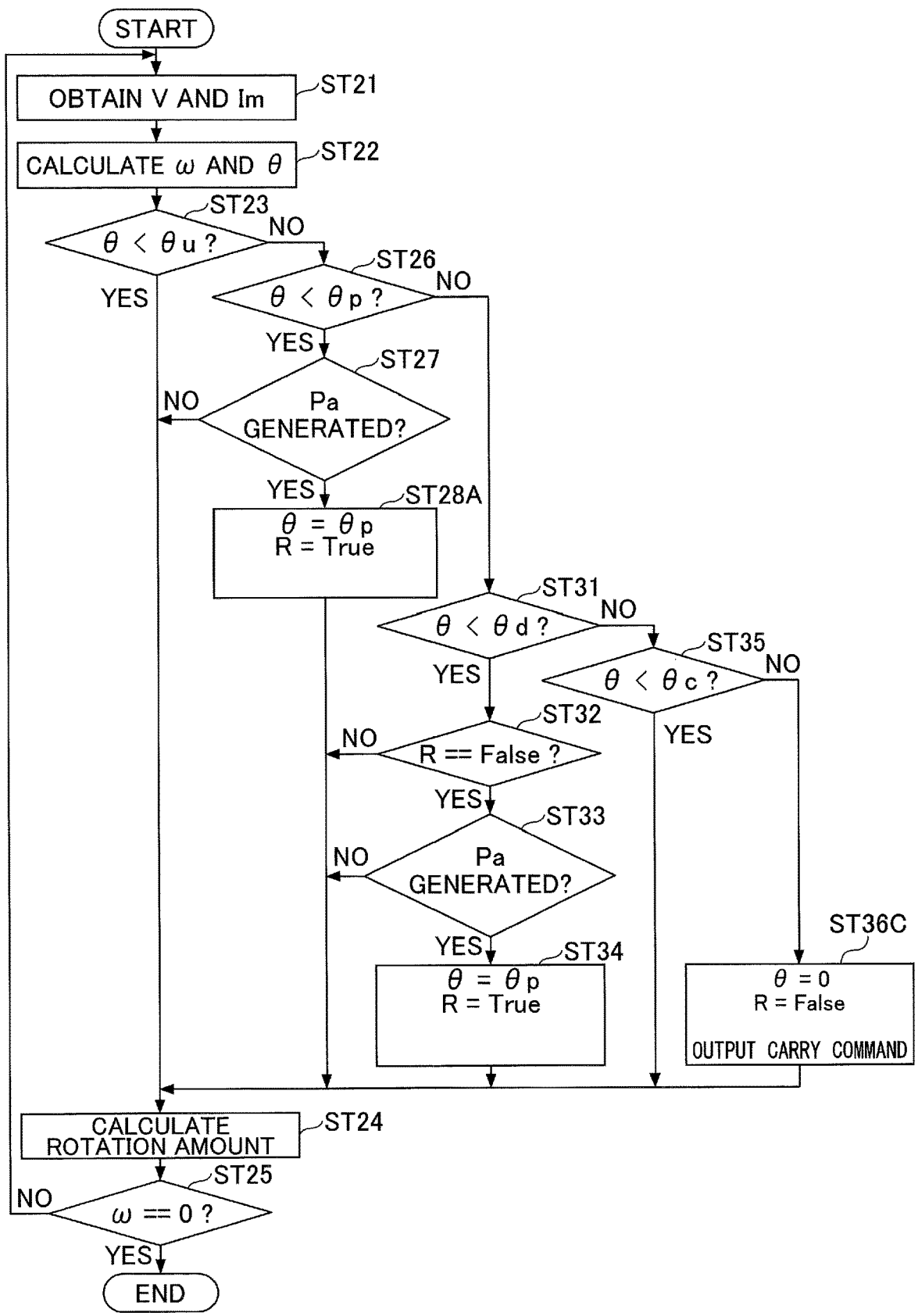
FIG. 18 is a flowchart illustrating an example of a rotation-amount calculation process performed by the rotation angle detector of FIG. 17.
Figure 19:
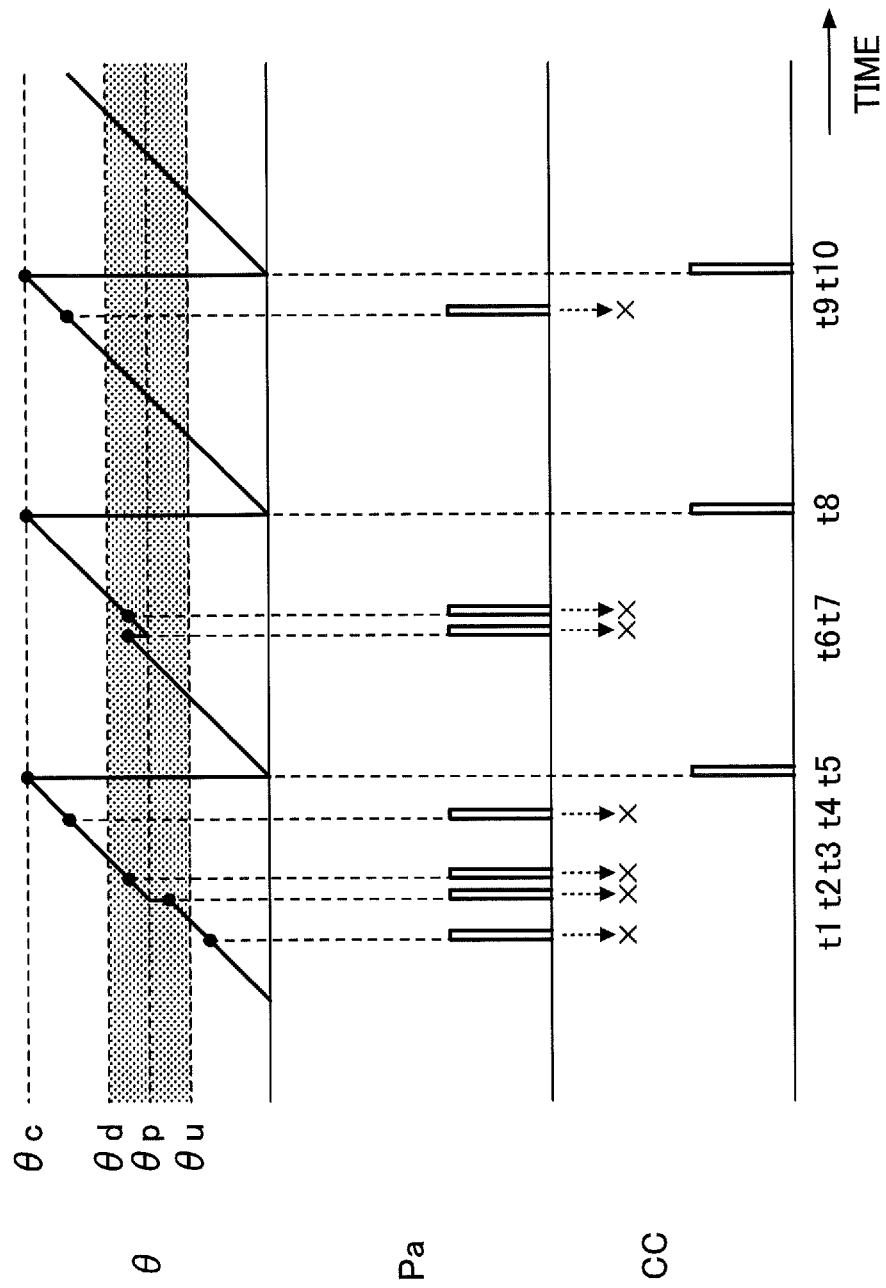
FIG. 19 is a timing chart illustrating an example of timings at which carry commands are output.

Next, an example of a rotation-amount calculation process performed by the rotation angle detector 100 illustrated in FIG. 17 is described with reference to FIGS. 18 and 19. FIG. 18 is a flowchart illustrating an example of a rotation-amount calculation process performed by the rotation angle detector 100 illustrated in FIG. 17. The rotation angle detector 100 performs the rotation-amount calculation process while the motor 10 is being driven. FIG. 19 is a timing chart illustrating an example of timings at which the carry determiner 35A outputs carry commands CC by performing the rotation-amount calculation process illustrated in FIG. 18. In FIG. 19, an acceptable range where the rotation angle θ is greater than or equal to the third angle θu and less than the fourth angle θd is indicated by a dot pattern.

The examples of FIGS. 18 and 19 are substantially the same as the examples of FIGS. 7 and 8 except that carry commands CC are generated instead of second pulse signals Pb. Specifically, in FIG. 18, step ST28A is performed instead of step ST28 in FIG. 7. Step ST28A is different from step ST28 in that the generation of the second pulse signal Pb and the setting of the flag G are omitted. Also in FIG. 18, step ST29 and step ST30 in FIG. 7 are omitted. Further, instead of step ST36 in FIG. 7, step ST36C is performed in FIG. 18. Step ST36C is different from step ST36 in that the setting of the flag G is omitted and the outputting of the carry command is added.

In the example of FIG. 19, the rotation angle θ at time t1 when the first signal generator 34 generates the first pulse signal Pa is less than the third angle θu. Therefore, the carry determiner 35A ignores the first pulse signal Pa generated by the first signal generator 34 at time t1 according to a process flow in FIG. 18 that proceeds from step ST23 to step ST24. That is, the carry determiner 35A does not output the carry command CC.

The rotation angle θ at time t2 when the first signal generator 34 generates the first pulse signal Pa is greater than or equal to the third angle θu and less than the first angle θp. The first pulse signal Pa generated by the first signal generator 34 at time t2 is the initial first pulse signal Pa generated for the first time during a period where the rotation angle θ increases from the third angle θu to the first angle θp. Therefore, the carry determiner 35A corrects the rotation angle θ to the first angle θp and sets the flag R to True according to a process flow in FIG. 18 that starts from step ST26, goes through steps ST27 and ST28A, and leads to step ST24. In this case, the carry determiner 35A does not output the carry command CC.

The rotation angle θ at time t3 when the first signal generator 34 generates the first pulse signal Pa is greater than or equal to the first angle θp and less than the fourth angle θd. Therefore, the carry determiner 35A ignores the first pulse signal Pa generated by the first signal generator 34 at time t3 according to a process flow in FIG. 18 that starts from step ST31, goes through step ST32, and leads to step ST24. That is, the carry determiner 35A does not output the carry command CC.

The rotation angle θ at time t4 when the first signal generator 34 generates the first pulse signal Pa is greater than or equal to the fourth angle θd and less than the second angle θc. Therefore, the carry determiner 35A ignores the first pulse signal Pa generated by the first signal generator 34 at time t4 according to a process flow in FIG. 18 that proceeds from step ST35 to step ST24. That is, the carry determiner 35A does not output the carry command CC. The same applies to time t9.

At time t5, the rotation angle θ reaches the second angle θc. Therefore, the carry determiner 35A resets the rotation angle θ to zero, sets the flag R to False, and outputs the carry command according to a process flow in FIG. 18 that proceeds from step ST35 to step ST36C. The same applies to time t8 and time t10.

The rotation angle θ at time t6 when the first signal generator 34 generates the first pulse signal Pa is greater than or equal to the first angle θp and less than the fourth angle θd. Also, the first pulse signal Pa generated by the first signal generator 34 at time t6 is the initial first pulse signal Pa generated for the first time during a period where the rotation angle θ increases from the third angle θu to the fourth angle θd. Therefore, the carry determiner 35A corrects the rotation angle θ to the first angle θp and sets the flag R to True according to a process flow in FIG. 18 that starts from step ST31, goes through steps ST32, ST33, and ST34, and leads to step ST24. In this case, the carry determiner 35A does not output the carry command CC.

The rotation angle θ at time t7 when the first signal generator 34 generates the first pulse signal Pa is greater than or equal to the first angle θp and less than the fourth angle θd. Also, the first pulse signal Pa generated by the first signal generator 34 at time t7 is not the initial first pulse signal Pa but the second first pulse signal Pa generated during the period where the rotation angle θ increases from the third angle θu to the fourth angle θd. Therefore, the carry determiner 35A ignores the first pulse signal Pa generated by the first signal generator 34 at time t7 according to a process flow in FIG. 18 that starts from step ST32, skips steps ST33 and ST34, and leads to step ST24. That is, the carry determiner 35A does not output the carry command CC.

As described above, the carry determiner 35A is configured to output the carry command each time the rotation angle θ reaches the second angle θc irrespective of the timing at which the first pulse signal Pa is generated. That is, the carry determiner 35A is configured to output the carry command each time the actual rotation angle of the motor 10 reaches the second angle θc. For this reason, the carry determiner 35A can set the output timing of the carry command outside of the acceptable range. This in turn makes it possible to correct the rotation angle θ to the first angle θp and output the carry command at different timings and thereby makes it possible to simplify the rotation-amount calculation process.

Figure 20:
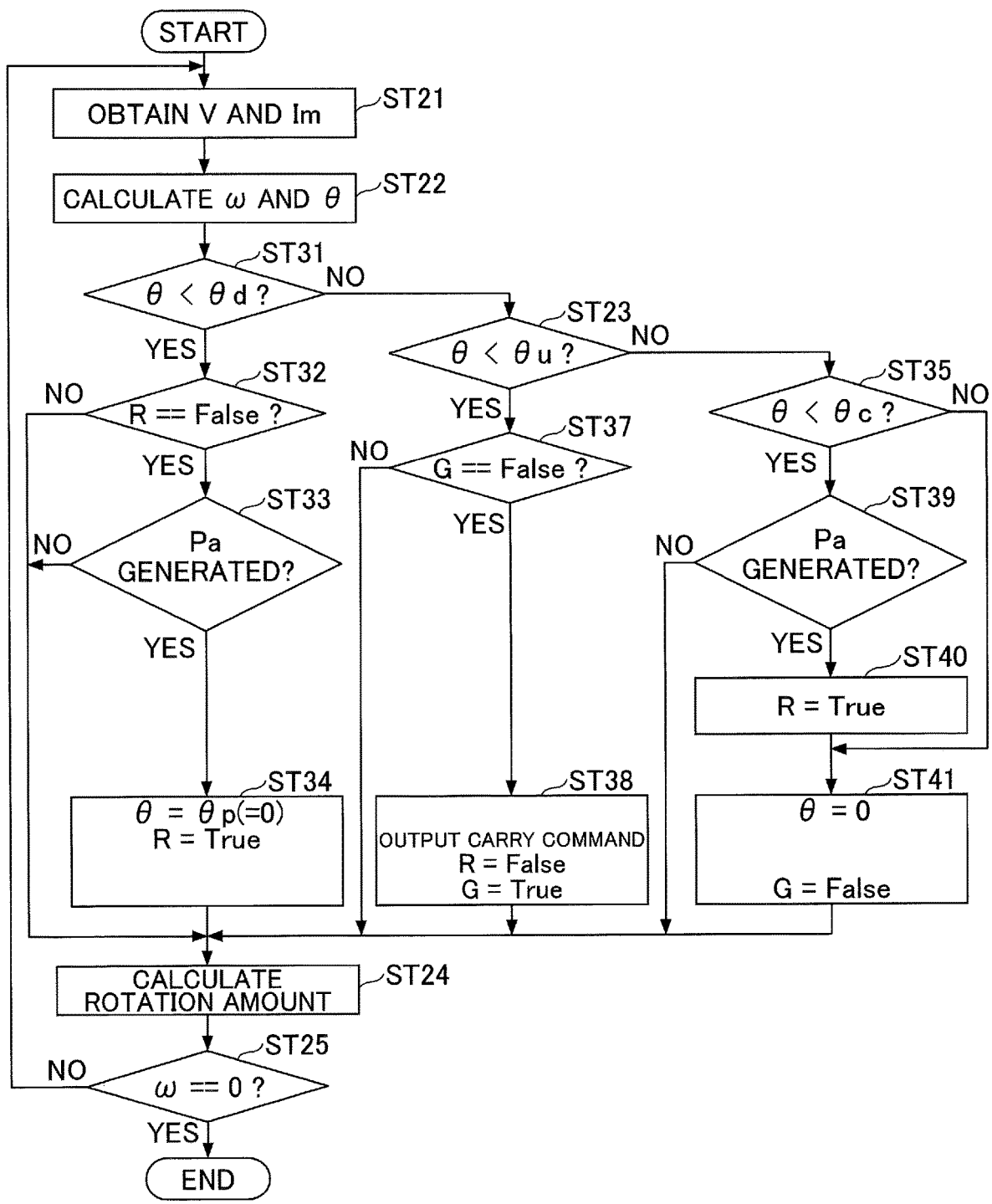
FIG. 20 is a flowchart illustrating another example of a rotation-amount calculation process performed by the rotation angle detector of FIG. 17.
Figure 21:
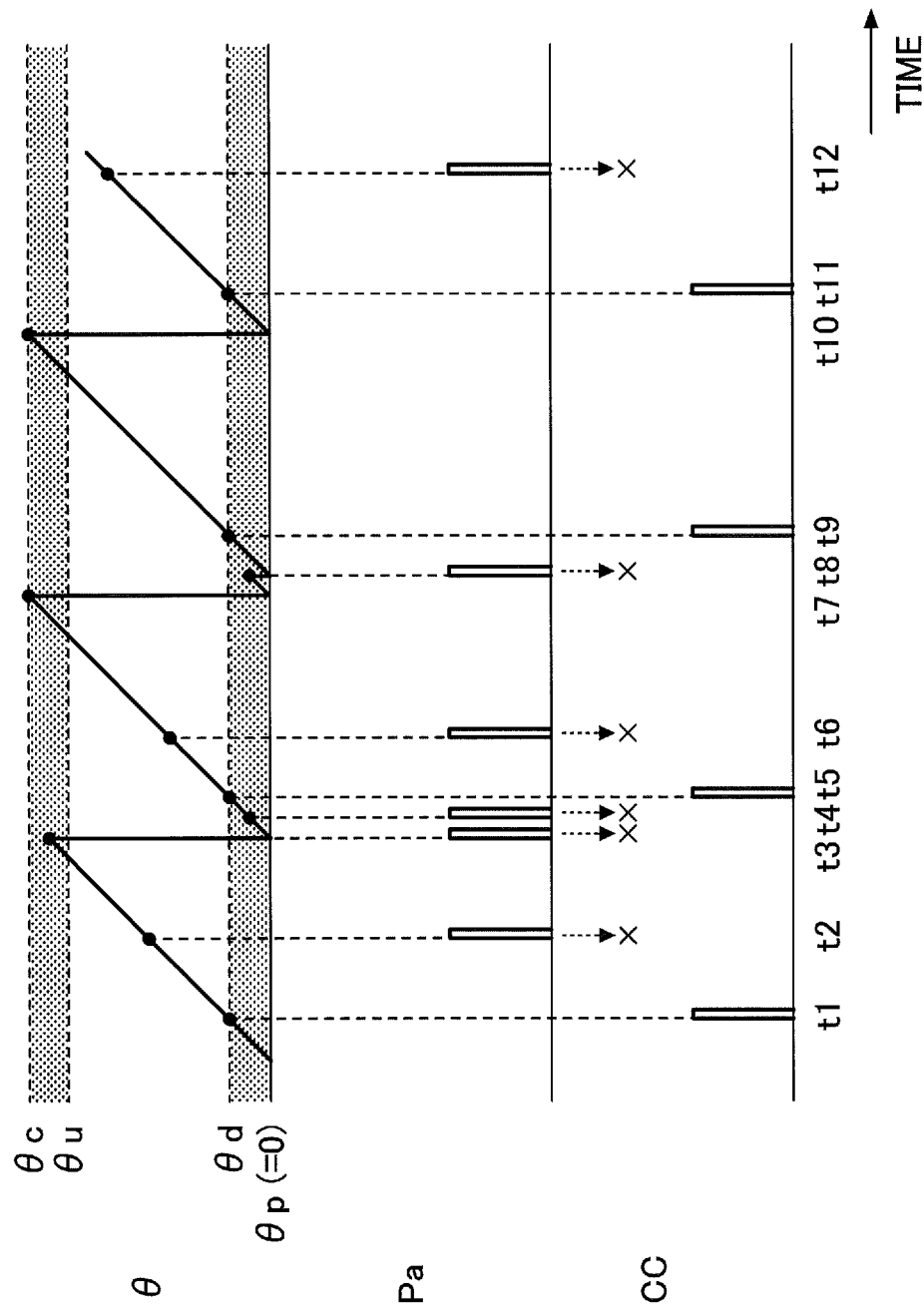
FIG. 21 is a timing chart illustrating another example of timings at which carry commands are output.

Next, another example of a rotation-amount calculation process performed by the rotation angle detector 100 illustrated in FIG. 17 is described with reference to FIGS. 20 and 21. FIG. 20 is a flowchart illustrating another example of a rotation-amount calculation process performed by the rotation angle detector 100 illustrated in FIG. 17. The rotation angle detector 100 performs the rotation-amount calculation process while the motor 10 is being driven. FIG. 21 is a timing chart illustrating an example of timings at which the carry determiner 35A outputs carry commands CC by performing the rotation-amount calculation process illustrated in FIG. 20. In FIG. 21, an acceptable range indicated by a dot pattern is a combination of an angle range where the rotation angle θ is greater than or equal to the third angle θu and less than the second angle θc and an angle range where the rotation angle θ is greater than or equal to the first angle θp (zero) and less than the fourth angle θd.

The examples of FIGS. 20 and 21 are substantially the same as the examples of FIGS. 7 and 8 except that carry commands CC are generated instead of second pulse signals Pb, the fourth angle θd is less than the third angle θu, and the first angle θp is zero. Specifically, in FIG. 20, because the fourth angle θd is less than the third angle θu, step ST31 of determining whether the rotation angle θ is less than the fourth angle θd is performed before step ST23 of determining whether the rotation angle θ is less than the third angle θu. When it is determined that the rotation angle θ is greater than or equal to the fourth angle θd and less than the third angle θu (YES at step ST23), the rotation angle detector 100 executes step ST37 of determining whether the flag G is False; and when the flag G is False, the rotation angle detector 100 executes step ST38 of outputting the carry command, setting the flag R to False, and setting the flag G to True.

In the example of FIG. 20, the flag G indicates whether the carry command has been output. The initial value of the flag G is False indicating that the carry command has not been output. If the flag G is True, it indicates that the carry command has already been output.

When the rotation angle θ is greater than or equal to the third angle θu and less than the second angle θc (YES at step ST35), the rotation angle detector 100 executes step ST39 of determining whether the first pulse signal Pa has been generated. When it is determined that the first pulse signal Pa has been generated (YES at step ST39), the rotation angle detector 100 executes step ST40 of setting the flag R to True and step ST41 of resetting the rotation angle θ to zero and setting the flag G to False. When the rotation angle θ has reached the second angle θc (NO at step ST35), the rotation angle detector 100 executes step ST41 of resetting the rotation angle θ to zero and setting the flags G to False.

Also, in FIG. 21, different from the acceptable range illustrated in FIG. 8, an acceptable range indicated by a dot pattern is separated into two ranges.

In the example of FIG. 21, the rotation angle θ reaches the fourth angle θd at time t1. Therefore, the carry determiner 35A outputs the carry command, sets the flag R to False, and sets the flag G to True according to a process flow in FIG.

20 that starts from step ST23, goes through steps ST37 and ST38, and leads to step ST24. The same applies to times t5, t9, and t11.

The rotation angle θ at time t2 when the first signal generator 34 generates the first pulse signal Pa is greater than or equal to the fourth angle θd and less than the third angle θu. Also, the carry determiner 35A has already output the carry command at time t1. Therefore, the carry determiner 35A ignores the first pulse signal Pa generated by the first signal generator 34 at time t2 according to a process flow in FIG. 20 that starts from step ST37, skips step ST38, and leads to step ST24. That is, the carry determiner 35A neither outputs the carry command CC nor resets the rotation angle θ. The same applies to times t6 and t12.

The rotation angle θ at time t3 when the first signal generator 34 generates the first pulse signal Pa is greater than or equal to the third angle θu and less than the second angle θc. The first pulse signal Pa generated by the first signal generator 34 at time t3 is the initial first pulse signal Pa generated for the first time during a period where the rotation angle θ increases from the third angle θu to the second angle θc. Therefore, the carry determiner 35A resets the rotation angle θ to zero and sets the flag G to False according to a process flow in FIG. 20 that starts from step ST35, goes through steps ST39, ST40, and ST41, and leads to step ST24.

The rotation angle θ at time t4 when the first signal generator 34 generates the first pulse signal Pa is greater than or equal to the first angle θp (zero) and less than the fourth angle θd. The first pulse signal Pa generated by the first signal generator 34 at time t4 is not the initial first pulse signal Pa but the second first pulse signal Pa that is generated during a period where the rotation angle θ increases from the third angle θu to the second angle θc, is reset to zero, and increases to the fourth angle θd. Therefore, the carry determiner 35A ignores the first pulse signal Pa generated by the first signal generator 34 at time t4 according to a process flow in FIG. 20 that starts from step ST32, skips steps ST33 and ST34, and leads to step ST24. That is, the carry determiner 35A neither outputs the carry command CC nor resets the rotation angle θ.

At time t7, the rotation angle θ reaches the second angle θc. Therefore, the carry determiner 35A resets the rotation angle θ to zero and sets the flag G to False according to a process flow in FIG. 20 that starts from step ST35, goes through step ST41, and leads to step ST24. The same applies to time t10.

The rotation angle θ at time t8 when the first signal generator 34 generates the first pulse signal Pa is greater than or equal to the first angle θp (zero) and less than the fourth angle θd. The first pulse signal Pa generated by the first signal generator 34 at time t8 is the initial first pulse signal Pa that is generated for the first time during a period where the rotation angle θ increases from the third angle θu to the second angle θc, is reset to zero, and increases to the fourth angle θd. Therefore, the carry determiner 35A corrects the rotation angle θ to the first angle θp (resets the rotation angle θ to zero) and sets the flag R to True according to a process flow in FIG. 20 that starts from step ST33, goes through step ST34, and leads to step ST24.

As described above, the carry determiner 35A is configured to output the carry command each time the rotation angle θ reaches the fourth angle θd irrespective of the timing at which the first pulse signal Pa is generated. That is, the carry determiner 35A is configured to output the carry command each time the motor 10 actually rotates by the second angle θc. For this reason, the carry determiner 35A can set the output timing of the carry command outside of the acceptable range. This in turn makes it possible to correct the rotation angle θ to the first angle θp (or reset the rotation angle θ to zero) and output the carry command at different timings and thereby makes it possible to simplify the rotation-amount calculation process.

As described above, the rotation angle detector 100 obtains rotation information of the motor 10 including the commutator 20. The rotation angle detector 100 may include the rotation angle calculator 32 that calculates the rotation angle θ based on the inter-terminal voltage V and the current Im; the first signal generator 34 that generates the first pulse signal Pa, which is an example of a first signal, based on the ripple component Ir included in the current Im; the second signal generator 35 that generates the second pulse signal Pb each time the motor 10 rotates by an angle corresponding to the period of the ripple component Ir based on the first pulse signal Pa and the rotation angle θ; and the rotation information calculator 36 that calculates rotation information based on outputs from the second signal generator 35. The second signal generator 35 is configured to ignore the first pulse signal Pa that is received when a condition regarding a predetermined angle range is satisfied. For example, as described above using the examples of FIGS. 4 and 5, the second signal generator 35 is configured to ignore the first pulse signal Pa that is received when the rotation angle θ is greater than or equal to the fourth angle θd and less than the third angle θu (i.e., in the angle range R1). This configuration makes it possible to prevent the rotation angle θ from being erroneously reset to zero due to the first pulse signal Pa generated based on, for example, noise. This in turn makes it possible to obtain highly-reliable rotation information of the motor 10 without using a rotation sensor such as a Hall sensor. This indicates that components such as a sensor interface circuit and a harness necessary to use a rotation sensor can be omitted. This in turn makes it possible to reduce the weight, the costs, and the size of the rotation angle detector 100.

A motor module includes the motor 10 and the rotation angle detector 100 that detects the rotation angle of the motor 10. The motor 10 includes the commutator 20 that includes multiple commutator segments 20a. Also, the rotation angle detector 100 may include the rotation angle calculator 32 that calculates the rotation angle θ based on the inter-terminal voltage V of the motor 10 and the current Im flowing through the motor 10 and outputs a rotation angle signal; the first signal generator 34 that generates the first pulse signal Pa, which is an example of a first signal, based on the ripple component Ir included in the current Im flowing through the motor 10; the operation part that corrects the rotation angle θ based on both of the first pulse signal Pa and the rotation angle signal; and the rotation information calculator 36 that calculates information on the rotation of the motor 10 based on outputs from the operation part. When the first pulse signal Pa is initially generated while the rotation angle θ is within an acceptable range, which is an example of a predetermined angle range, the operation part outputs, to the rotation angle calculator 32, a command to correct the rotation angle θ to the first angle θp within the acceptable range. Also, the operation part is configured to ignore a second or subsequent first pulse signal Pa generated while the rotation angle θ is within the acceptable range.

The operation part may be configured to output a command to reset the rotation angle θ to zero to the rotation angle calculator 32 when the rotation angle θ reaches the second angle θc. The second angle θc may be, for example, an angle corresponding to one period of the ripple component Ir. Also, the second angle θc may be, for example, an angle that is equal to the central angle of each of the commutator segments 20a that are separated by the slits 20s.

As indicated by the dot pattern in each of FIGS. 4, 14, and 16, the acceptable range, which is an example of a predetermined angle range, may be a combination of a range that is greater than or equal to the third angle θu, which is less than the second angle θc, and less than or equal to the second angle θc and a range that is greater than or equal to zero and less than or equal to the fourth angle θd, which is less than the third angle θu.

The second signal generator 35, which is an example of an operation part, may be configured to generate the second pulse signal Pb indicating that the motor 10 has rotated by a predetermined angle when the first pulse signal Pa is initially generated while the rotation angle θ is greater than the third angle θu and less than the second angle θc as illustrated, for example, in FIG. 4, and to output a command to correct the rotation angle θ to the first angle θp (zero) to the rotation angle calculator 32. Also, the second signal generator 35 may be configured to generate the second pulse signal Pb when the rotation angle θ reaches the second angle θc before the first pulse signal Pa is generated.

As illustrated in FIG. 14, the first angle θp may be greater than the third angle θu and less than the second angle θc. In this case, the second signal generator 35, which is an example of the operation part, may be configured to generate the second pulse signal Pb indicating that the motor 10 has rotated by a predetermined angle when the first pulse signal Pa is initially generated while the rotation angle θ is greater than the third angle θu and less than the second angle θc, and to output a command to correct the rotation angle θ to the first angle θp to the rotation angle calculator 32. Also, the second signal generator 35 may be configured to generate the second pulse signal Pb when the rotation angle θ reaches the first angle θp before the first pulse signal Pa is generated.

As illustrated in FIG. 16, the first angle θp may be greater than zero and less than the fourth angle θd. In this case, the second signal generator 35, which is an example of the operation part, may be configured to generate the second pulse signal Pb indicating that the motor 10 has rotated by a predetermined angle when the first pulse signal Pa is initially generated while the rotation angle θ is greater than the third angle θu and less than the second angle θc or the rotation angle θ is less than the first angle θp, and to output a command to correct the rotation angle θ to the first angle θp to the rotation angle calculator 32. Also, the second signal generator 35 may be configured to generate the second pulse signal Pb when the rotation angle θ reaches the first angle θp before the first pulse signal Pa is generated.

As indicated by the dot pattern in each of FIGS. 8, 10, and 12, the acceptable range, which is an example of a predetermined angle range, may be greater than or equal to the third angle θu, which is less than the first angle θp, and less than or equal to the fourth angle θd, which is greater than the first angle θp. In this case, the second signal generator 35, which is an example of the operation part, may be configured to generate the second pulse signal Pb indicating that the motor 10 has rotated by a predetermined angle when the first pulse signal Pa is initially generated while the rotation angle θ is greater than or equal to the third angle θu and less than or equal to the first angle θp. Also, the second signal generator 35 may be configured to generate the second pulse signal Pb when the rotation angle θ reaches the first angle θp before the first pulse signal Pa is generated. In this case, the third angle θu may be zero as illustrated in FIG. 10. Also, the fourth angle θd may be the same as the second angle θc as illustrated in FIG. 12.

The third angle θu and the fourth angle θd may be determined based on the maximum phase difference (maximum error) between the rotation angle θ and the actual rotation angle of the motor 10 at the timing when the rotation angle θ becomes the first angle θp. For example, as illustrated in FIG. 4, the third angle θu may be set as the maximum phase difference (maximum error) between the rotation angle θ and the actual rotation angle (>rotation angle θ) of the motor 10 at the timing when the rotation angle θ becomes the first angle θp. In this case, the difference between the rotation angle θ and the actual rotation angle of the motor 10 is less than the angle α and is within a practically acceptable range. Also, as illustrated in FIG. 4, the fourth angle θd may be set as the maximum phase difference (maximum error) between the rotation angle θ and the actual rotation angle (<rotation angle θ) of the motor 10 at the timing when the rotation angle θ becomes the first angle θp. In this case, the difference between the rotation angle θ and the actual rotation angle of the motor 10 is less than the angle β and is within a practically acceptable range.

As indicated by the dot pattern in each of FIGS. 4, 8, 10, 12, 14, and 16, the second signal generator 35, which is an example of the operation part, may be configured to output the second pulse signal Pb when the first pulse signal Pa is initially generated while the rotation angle θ is within the acceptable range.

Also, the carry determiner 35A, which is an operation part, and the rotation information calculator 36 in FIG. 17 may be combined into a single component. In this case, the carry determiner 35A may be configured to output a carry command as a software instruction indicating that the motor 10 has rotated by a predetermined angle.

As described above using the examples illustrated in FIGS. 4 through 21, the second signal generator 35 is configured to validate the initial first pulse signal Pa received when the rotation angle θ is less than the fourth angle θd, and invalidate the second and subsequent first pulse signals Pa. Therefore, even if multiple first pulse signals Pa are generated consecutively in a short period of time due to, for example, noise, the second signal generator 35 can obtain one first pulse signal Pa as a valid signal, and ignore one or more first pulse signals Pa other than the one first pulse signal Pa as invalid signals.

As described above using the examples of FIGS. 4 through 21, the second signal generator 35 is configured to output, to the rotation angle calculator 32, a command to reset the rotation angle θ to zero when the initial first pulse signal Pa is received while the rotation angle θ is less than the fourth angle θd, and to not output, to the rotation angle calculator 32, a command to reset the rotation angle θ to zero when the second or subsequent first pulse signal Pa is received. Thus, even if multiple first pulse signals Pa are generated consecutively in a short period of time due to, for example, noise, this configuration can prevent the rotation angle θ from being erroneously reset in response to one or more first pulse signals Pa other than the one first pulse signal Pa.

The rotation angle detector 100 generates the second pulse signal Pb using the first pulse signal Pa generated based on the ripple component Ir of the current Im and the rotation angle θ calculated based on the inter-terminal voltage V and the current Im. That is, the rotation angle detector 100 generates the second pulse signal Pb based on the first pulse signal Pa and the rotation angle θ that are two parameters obtained by different methods. With this configuration, even when a first parameter of the parameters is not obtained properly, the rotation angle detector 100 can compensate for the first parameter by using a second parameter of the parameters. Accordingly, the rotation angle detector 100 can obtain more reliable rotation information of the motor 10.

For example, the rotation angle calculator 32 is configured to calculate the rotation angle θ by integrating the rotational angular velocities co of the motor 10 that are calculated based on the inter-terminal voltage V and the current Im. With this configuration, the rotation angle calculator 32 can stably and continuously calculate the rotation angle θ throughout the entire period including a period immediately after the motor 10 is started and an inertial rotation period. Also, the second signal generator 35 is configured to generate the second pulse signal Pb immediately when the rotation angle θ reaches a predetermined angle. Accordingly, even if a generation failure of the first pulse signal Pa occurs, the second signal generator 35 can generate, in real time, the second pulse signal Pb indicating that the motor 10 has rotated by a predetermined angle based on the stably and continuously calculated rotation angle θ. Therefore, the rotation angle detector 100 can calculate the rotation information of the motor 10 without delay.

The second signal generator 35 is configured to output, to the rotation angle calculator 32, a command to reset the rotation angle θ to zero when, for example, the rotation angle θ reaches the second angle θc. With this configuration, the maximum value of the rotation angle θ calculated by the rotation angle calculator 32 is the second angle θc. Therefore, this configuration makes it possible to reduce the size of a memory necessary to store the rotation angle θ.

The predetermined angle range corresponds to the range of the maximum error in the rotation angle θ output from the rotation angle calculator 32. The maximum error occurs each time the motor 10 rotates by the central angle of the arc of the commutator segment 20a, i.e., the inter-slit angle (the second angle θc). Here, when the rotational angular velocity calculator 31 calculates a rotational angular velocity ω that is greater than the actual rotational angular velocity, the maximum value of the rotation angle θ (including an error), at which the first pulse signal Pa based on the actual rotation angle is generated, is the fourth angle θd. Also, when the rotational angular velocity calculator 31 calculates a rotational angular velocity that is less than the actual rotational angular velocity, the minimum value of the rotation angle θ (including an error), at which the first pulse signal Pa based on the actual rotation angle is generated, is the third angle θu. Therefore, in the rotation angle detector 100, errors in the rotation angle θ calculated by the rotation angle calculator 32 are not accumulated. That is, regardless of the number of rotations of the motor 10, the error can be kept within a range between −α and +β.

The second signal generator 35 is configured to generate the second pulse signal Pb if the rotation angle θ is greater than or equal to the third angle θu when the first pulse signal Pa is received. The third angle θu is preset as a value less than the first angle θp. With this configuration, the second signal generator 35 assumes that the first pulse signal Pa generated when the rotation angle θ is greater than or equal to the third angle θu is not based on noise. Also, the second signal generator 35 generates the second pulse signal Pb when the rotation angle θ reaches the first angle θp even if the first pulse signal Pa is not generated. This configuration makes it possible to prevent the calculation of rotation information from being influenced by the generation failure of the first pulse signal Pa.

Also, the second signal generator 35 is configured to not generate the second pulse signal Pb if the rotation angle θ is less than the third angle θu when the first pulse signal Pa is received. With this configuration, the second signal generator 35 can determine that the first pulse signal Pa generated when the rotation angle θ is less than the third angle θu is based on noise. This in turn makes it possible to prevent generation of a second pulse signal Pb corresponding to a first pulse signal Pa generated based on noise. That is, the above configuration makes it possible to reliably prevent the calculation of rotation information from being influenced by the first pulse signal Pa generated based on noise.

Further, the second signal generator 35 is configured to output, to the rotation angle calculator 32, a command to reset the rotation angle θ to zero if the rotation angle θ is less than the fourth angle θd when the first pulse signal Pa is received. The fourth angle θd is preset as a value whose phase is delayed by p relative to the first angle θp. With this configuration, the second signal generator 35 assumes that the first pulse signal Pa is not based on noise if the first pulse signal Pa is received immediately after the second pulse signal Pb is generated prior to a generation failure of the first pulse signal Pa. The first pulse signal Pa can be associated with the second pulse signal Pb generated immediately before the first pulse signal Pa is received. This configuration makes it possible to reliably prevent the calculation of rotation information from being influenced by an error in the generation timing of the first pulse signal Pa.

An aspect of this disclosure makes it possible to provide an apparatus and a method that can obtain highly-reliable information on the rotation of a DC commutator motor.

A motor module, a rotation angle detector, and a method for detecting the rotation angle of a motor according to embodiments of the present invention are described above. However, the present invention is not limited to the specifically disclosed embodiments, and variations and modifications may be made without departing from the scope of the present invention.

What is claimed is:

1. A motor module, comprising:
   a motor; and
   a rotation angle detector that detects a rotation angle of the motor, wherein
   the motor includes a commutator including multiple commutator segments;
   the rotation angle detector includes
      a rotation angle calculator that calculates the rotation angle based on an inter-terminal voltage between terminals of the motor and an electric current flowing through the motor and outputs a rotation angle signal indicating the rotation angle,
      a first signal generator that generates a first signal based on a ripple component included in the electric current flowing through the motor,
      an operation part that corrects the rotation angle based on both of the first signal and the rotation angle signal, and
      a rotation information calculator that calculates information on rotation of the motor based on an output from the operation part;
   the operation part
      outputs, to the rotation angle calculator, a command to correct the rotation angle to a first angle within a predetermined angle range when the first signal is generated for a first time while the rotation angle is within the predetermined angle range, and ignores the first signal that is generated for a second or subsequent time while the rotation angle is within the predetermined angle range;

when the rotation angle reaches a second angle, the operation part outputs a command to correct the rotation angle to zero to the rotation angle calculator; and the predetermined angle range includes
a range that is greater than or equal to a third angle, which is less than the second angle, and less than or equal to the second angle, and
a range that is greater than or equal to zero and less than or equal to a fourth angle, which is less than the third angle.

2. The motor module as claimed in claim 1, wherein the second angle corresponds to one period of the ripple component.

3. The motor module as claimed in claim 2, wherein the second angle is equal to a central angle of each of the commutator segments that are separated from each other by slits.

4. The motor module as claimed in claim 1, wherein
the first angle is zero;
when the first signal is generated for the first time while the rotation angle is greater than the third angle and less than the second angle, the operation part generates a second signal indicating that the motor has rotated by a predetermined angle, and outputs a command to correct the rotation angle to the first angle to the rotation angle calculator; and
when the rotation angle reaches the second angle before the first signal is generated, the operation part generates the second signal.

5. The motor module as claimed in claim 1, wherein
the first angle is greater than the third angle and less than the second angle;
when the first signal is generated for the first time while the rotation angle is greater than the third angle and less than the second angle, the operation part generates a second signal indicating that the motor has rotated by a predetermined angle, and outputs a command to correct the rotation angle to the first angle to the rotation angle calculator; and
when the rotation angle reaches the first angle before the first signal is generated, the operation part generates the second signal.

6. The motor module as claimed in claim 1, wherein
the first angle is greater than zero and less than the fourth angle;
when the first signal is generated for the first time while the rotation angle is greater than the third angle and less than the second angle or the rotation angle is less than the first angle, the operation part generates a second signal indicating that the motor has rotated by a predetermined angle, and outputs a command to correct the rotation angle to the first angle to the rotation angle calculator; and
when the rotation angle reaches the first angle before the first signal is generated, the operation part generates the second signal.

7. The motor module as claimed in claim 1, wherein the third angle and the fourth angle are set based on a maximum phase difference between the rotation angle and an actual rotation angle of the motor at a time when the rotation angle becomes the first angle.

8. The motor module as claimed in claim 1, wherein when the first signal is generated for the first time while the rotation angle is within the predetermined angle range, the operation part outputs a second signal indicating that the motor has rotated by a predetermined angle.

9. The motor module as claimed in claim 1, wherein
the operation part and the rotation information calculator are integrated with each other; and
the operation part outputs a carry command that is a software instruction indicating that the motor has rotated by a predetermined angle.

10. A motor module, comprising:
a motor; and
a rotation angle detector that detects a rotation angle of the motor, wherein
the motor includes a commutator including multiple commutator segments;
the rotation angle detector includes
a rotation angle calculator that calculates the rotation angle based on an inter-terminal voltage between terminals of the motor and an electric current flowing through the motor and outputs a rotation angle signal indicating the rotation angle,
a first signal generator that generates a first signal based on a ripple component included in the electric current flowing through the motor,
an operation part that corrects the rotation angle based on both of the first signal and the rotation angle signal, and
a rotation information calculator that calculates information on rotation of the motor based on an output from the operation part;
the operation part
outputs, to the rotation angle calculator, a command to correct the rotation angle to a first angle within a predetermined angle range when the first signal is generated for a first time while the rotation angle is within the predetermined angle range, and
ignores the first signal that is generated for a second or subsequent time while the rotation angle is within the predetermined angle range;
when the rotation angle reaches a second angle, the operation part outputs a command to correct the rotation angle to zero to the rotation angle calculator; and
the predetermined angle range is greater than or equal to a third angle, which is less than the first angle, and less than or equal to a fourth angle, which is greater than the first angle;
when the first signal is generated for the first time while the rotation angle is greater than or equal to the third angle and less than or equal to the first angle, the operation part generates a second signal indicating that the motor has rotated by a predetermined angle; and
when the rotation angle reaches the first angle before the first signal is generated, the operation part generates the second signal.

11. The motor module as claimed in claim 10, wherein the third angle is zero.

12. The motor module as claimed in claim 10, wherein the second angle is equal to the fourth angle.

13. The motor module as claimed in claim 10, wherein
the operation part and the rotation information calculator are integrated with each other; and
the operation part outputs a carry command that is a software instruction indicating that the motor has rotated by a predetermined angle.

14. The motor module as claimed in claim 10, wherein the second angle corresponds to one period of the ripple component.

15. The motor module as claimed in claim 14, wherein the second angle is equal to a central angle of each of the commutator segments that are separated from each other by slits.

* * * * *